United States Patent
Yoshikawa et al.

(10) Patent No.: US 6,955,086 B2
(45) Date of Patent: Oct. 18, 2005

(54) ACCELERATION SENSOR

(75) Inventors: Eiji Yoshikawa, Tokyo (JP); Masahiro Tsugai, Tokyo (JP); Nobuaki Konno, Tokyo (JP); Yoshiaki Hirata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/739,069

(22) Filed: Dec. 19, 2003

(65) Prior Publication Data
US 2004/0079154 A1 Apr. 29, 2004

Related U.S. Application Data

(63) Continuation-in-part of application No. 10/450,054, filed as application No. PCT/JP01/10092 on Nov. 19, 2001, now abandoned.

(30) Foreign Application Priority Data

May 15, 2003 (JP) ........................................ 2003-136998

(51) Int. Cl.$^7$ ............................................ G01P 15/125
(52) U.S. Cl. .................. 73/514.32; 73/514.29
(58) Field of Search .................... 73/514.32, 514.29, 73/514.36, 514.16, 514.18, 514.21, 514.02, 514.01

(56) References Cited

U.S. PATENT DOCUMENTS 4,736,629 A 4/1988 Cole
5,126,812 A 6/1992 Greiff
5,905,203 A 5/1999 Glach et al.
6,763,716 B2 * 7/2004 Nagahara et al. ............. 73/493

FOREIGN PATENT DOCUMENTS

| EP | 0 773 443 | 5/1997 |
| JP | 05-133976 | 5/1993 |
| JP | 07-005193 | 1/1995 |
| WO | WO 91/14285 | 9/1991 |

* cited by examiner

Primary Examiner—Helen C. Kwok
(74) Attorney, Agent, or Firm—Leydig, Voit & Mayer, Ltd.

(57) ABSTRACT

An acceleration sensor includes first and second fixed electrodes on a substrate, and a movable electrode located above the first and second fixed electrodes, with respect to the substrate, and facing them. The movable electrode is elastically supported on the substrate by a first elastic supporting body and is movable. A mass, which is elastically supported on the substrate by a second elastic supporting body, moves in response to an acceleration in a direction perpendicular to the substrate. A linking portion links the movable electrode and the mass at a position spaced from an axis of movement of the movable electrode by a distance. Acceleration is measured based on changes in a first capacitance between the first fixed electrode and the movable electrode and a second capacitance between the second fixed electrode and the movable electrode. Thus, a highly impact resistant and highly reliable acceleration sensor is obtained.

15 Claims, 20 Drawing Sheets

ACCELERATION SENSOR

This disclosure is a continuation-in-part of U.S. patent application Ser. No. 10/450,054, filed Jun. 10, 2003 now abandoned.

TECHNICAL FIELD

The present invention relates to an acceleration sensor and, in particular, to a highly reliable, high impact resistant acceleration sensor.

BACKGROUND ART

FIG. 16 is a plan view of a conventional acceleration sensor, which is disclosed in Japan Laid Open Hei5-133976, for example. FIG. 17 is a sectional view taken at a line XVII—XVII in FIG. 16.

In FIGS. 16 and 17, a reference numeral 101 indicates a substrate. A first detecting electrode 102, a second detecting electrode 103 and a driving electrode 104 are provided on the substrate 101.

A reference numeral 105 indicates a movable electrode. The movable electrode 105 is provided within a frame of a semiconductor material 106 by facing against the first detecting electrode 102, the second detecting electrode 103, and the driving electrode 104. The movable electrode 105 is elastically supported by a deformation 107. The movable electrode 105 has a weight 108 at one end (an end on the second detecting electrode 103 side herein).

A metal contact 109 extends to a doped region 110 through an oxide film, 111. The doped region 110 extends downward and is in contact with the first detecting electrode 102, the second detecting electrode 103 and the driving electrode 104. The first detecting electrode 102, the second detecting electrode 103 and the driving electrode 104 may be provided on a different glass substrate. Alternatively, the first detecting electrode 102, the second detecting electrode 103 and the driving electrode 104 may be formed within the semiconductor material 106 by using a junction isolation technology or an oxide film isolation technology. The first detecting electrode 102, second detecting electrode 103 and driving electrode 104 in FIG. 17 are pn junction isolation embedded electrodes.

Next, the principle of acceleration detection by using such a conventional acceleration sensor will be described. FIG. 18 is a diagram for explaining a measuring principle by using the conventional acceleration sensor.

All of the first detecting electrode 102, the second detecting electrode 103 and the movable electrode 105 are conductive and are located by facing against each other. Capacitances C1 and C2 are provided between the first detecting electrode 102 and the movable electrode 105 and between the second detecting electrode 103 and the movable electrode 105, respectively. One end of the movable electrode 105, which is elastically supported by the deformation 107, has the weight 108. Therefore, the movable electrode 105 is sensitive to an acceleration in a depth direction of the semiconductor material 106. Then, the movable electrode 105 is easy to twist with respect to an axis linking the deformation 107. In other words, when an acceleration is applied in the depth direction of the semiconductor material 116 as indicated by an arrow 112, the movable electrode 105 twists with respect to the axis linking the deformation 107. Due to the twist of the movable electrode 105, an interelectrode distance on the capacitance C1 side is larger while an interelectrode distance on the capacitance C2 side is smaller between the capacitances C1 and C2. Therefore, a capacity value of the capacitance C1 decreases while a capacity value of the capacitance C2 increases. By differentially detecting the capacitance changes, the applied acceleration can be measured. When an acceleration is applied in a direction opposite to the arrow 112, the movable electrode 105 twists in a direction opposite to the above direction. Then, the capacity value of the capacitance C1 increases while the capacity value of the capacitance C2 decreases.

The conventional acceleration sensor uses an inertial force acting on the weight 108 when an acceleration is applied thereto to convert the acceleration to a twist of the movable electrode 105 and to changes in capacitances C1 and C2 between the first and second detecting electrodes 102 and 103 and the movable electrode 105. Thus, the acceleration can be measured. Therefore, as shown in FIG. 18, an amount of change dl in interelectrode distance between the first and second detecting electrodes 102 and 103 and the movable electrode 105 providing the capacitances C1 and C2 when an acceleration is applied is smaller than an amount of change d2 at the end of the movable electrode 105 having the weight 108. In other words, in view of a conversion efficiency of an acceleration due to an inertial force acting on the weight 108 to an amount of displacement of the movable electrode when the acceleration is applied, the conventional acceleration sensor cannot obtain a larger amount of displacement d1 of an interelectrode distance than an amount of displacement d2 of the weight 108. Therefore, a much larger amount of displacement of the weight is required than an amount of change in an interelectrode distance, which is required for obtaining a change in capacitance detectable by the detecting circuit side. This means that the rigidity of the deformation 107 is reduced more than necessary. A sensitivity to acceleration other than in a detecting axis direction may occur, which is not desirable as the sensor. The possibility that the movable electrode 105 is in contact with the semiconductor material 106 and/or the substrate 101 may be increased. Thus, the impact resistance and/or reliability of the sensor are disadvantageously reduced.

The weight 108 is required on the movable electrode 105 such that the movable electrode 105 can twist with respect to the deformation 107 when an acceleration is applied. However, the weight 108 is only provided at one end of the movable electrode 105. As a result, the center of gravity of the movable electrode 105 does not exist on the axis linking the deformation 107. Therefore, balance of the movable electrode 105 is difficult to obtain when no acceleration is applied. In other words, the movable electrode 105 twists even at the initial state. Therefore, a balanced state of the movable electrode 105 is hard to maintain. Thus, the same initial values of the capacitances C1 and C2 are difficult to obtain. As a result, the precision of detection may be reduced, and/or the step of calibrating a detecting characteristic may be complicated, disadvantageously.

Furthermore, the movable electrode 105 twists largely when an excessive acceleration is applied. Thus, the end may touch the substrate 101 and destroy the sensor structure.

In addition, no device is provided for correcting a characteristic changed due to a temperature change in an environment in use. Thus, an error may occur in acceleration obtained by the environment in use disadvantageously.

In view of the construction, the first detecting electrode 102, the second detecting electrode 103 and the driving electrode 104 are formed as embedded electrodes in the semiconductor material 106. The first detecting electrode 102, second detecting electrode 103 and driving electrode 104 and the metal contact 109 are connected electrically through the doped region 110. The depth of the first detecting electrode 102, second detecting electrode 103, driving electrode 104 as embedded electrodes and the doped region 110 in the semiconductor material 106 is limited by the processing technology physically. Due to the limitation and the detection principle, the flexibility in designing an amount of displacement of the movable electrode 105 decreases. Furthermore, the processing method is complicated, and the production cost increases disadvantageously.

The present invention was made in order to solve these problems. It is an object of the invention to provide a more reliable acceleration sensor for detecting an acceleration in a direction of a detection axis in a highly sensitive manner and for suppressing sensitivity to acceleration along other axes by improving the rigidity of the movable part.

It is another object of the invention to obtain an acceleration sensor having a construction with higher flexibility in design.

It is another object of the invention to obtain an acceleration sensor with higher impact resistance whereby the acceleration sensor is hard to damage when an excessive impact is applied thereto.

It is another object of the invention to obtain an acceleration sensor, which is small and inexpensive and can be mass-manufactured.

It is another object of the invention to obtain an acceleration sensor, which can detect accelerations in directions of three axes.

DISCLOSURE OF INVENTION

An acceleration sensor according to the invention includes a first and a second fixed electrodes provided on a substrate, a movable electrode which is provided above the first and second fixed electrodes by facing against them, and elastically and swingably supported on the substrate by a first elastic supporting body, a mass which is elastically supported on the substrate by a second elastic supporting body and is movable in response to an acceleration in a direction perpendicular to the substrate, and a linking portion for linking the movable electrode and the mass at a position away from a swing axis of the movable electrode by a predetermined distance. In this case, an acceleration is measured based on changes in a first capacitance by the first fixed electrode and the movable electrode and a second capacitance provided by the second fixed electrode and the movable electrode. Therefore, the displacement amount at the end of the movable electrode can be larger than the displacement amount of the mass when an acceleration is applied. In other words, a large detected capacity change can be obtained by a small displacement of the mass. Therefore, an acceleration sensor for detecting an acceleration with high sensitivity can be obtained without decreasing the rigidity of the torsion bar more than necessary. By improving the rigidity of the movable part, the sensitivity to the other axes is suppressed. Thus, a high impact resistant and highly reliable acceleration sensor can be obtained.

The movable electrode may be surrounded by the mass such that the center of gravity of the movable electrode and the center of gravity of the mass can coincide each other. Therefore, the balance of the movable electrode is maintained also at the initial state. Thus, the same initial capacity values of the capacitances can be obtained between the first fixed electrode and the movable electrode and between the second fixed electrode and the movable electrode. Therefore, the precision in measurement can be stabilized, and the calibration step can be easier.

A self-diagnosis electrode is provided to face against the mass on the substrate for checking the operation of the acceleration sensor by applying a voltage between the self-diagnosis electrode and the mass. As a result, even when an acceleration is not applied, a voltage may be applied between the self-diagnosis electrode and the mass to cause electrostatic gravity between them, to forcibly drive the mass. Then the movable electrode can swing with respect to the torsion bar. Therefore, the function can be self-diagnosed regarding whether the sensor structure is not destroyed.

A driving electrode is provided facing against the movable electrode on the substrate for driving a movable electrode to a predetermined position by applying a voltage between the driving electrode and the movable electrode. Thus, the acceleration sensor may be also of the servo type for returning a twist of a movable electrode caused in response to an applied acceleration to the original state by adjusting a voltage to be applied to the driving electrode. Therefore, the detection characteristic can be stabilized. Additionally, the possibility that the movable electrode and the substrate touch each other is extremely decreased. As a result, an highly reliable acceleration sensor can be obtained.

A correcting electrode is provided facing against the mass on the substrate for correcting a characteristic change due to a temperature change in an environment in use. Thus, an error in an acceleration obtained in the environment in use can be prevented.

A first capacitance voltage converter for converting a capacitance generated between the first and second fixed electrodes and the movable electrode to a voltage, a second capacitance voltage converter for converting a capacitance generated between the mass and the correcting electrode to a voltage, and a processor for computing an output value from the first capacitance voltage converter and an output value from the second capacitance voltage converter are provided. Thus, a characteristic change can be certainly corrected by using the correcting electrode.

By providing a second and a third acceleration sensors each for measuring an acceleration in a direction horizontal to the substrate surface, the second acceleration sensor and the third acceleration sensor are arranged to respond to accelerations in directions orthogonal to each other, an acceleration sensor for detecting accelerations in three axis directions can be obtained.

At least the movable electrode, the mass, the first bar, the second bar and the third bar may be integrally formed by polysilicon. Thus, the acceleration sensor can be manufactured easily. Furthermore, as the mass of the movable portion can be reduced significantly, the sensor structure is hard to destroy even when an excessive acceleration is applied. Therefore, the impact resistance can be improved.

Furthermore, at least the movable electrode, the mass, the first bar, the second bar and the third bar may be integrally formed by monocrystal silicon. Thus, the acceleration sensor can be manufactured easily. Additionally, the thicknesses of the movable electrode and mass can be adjusted easily. The mass of the mass and/or the capacitance can be set arbitrarily. Accordingly, the flexibility in designing the acceleration sensor can be increased.

BEST MODE FOR CARRYING OUT THE INVENTION

Embodiment 1

Figure 1:
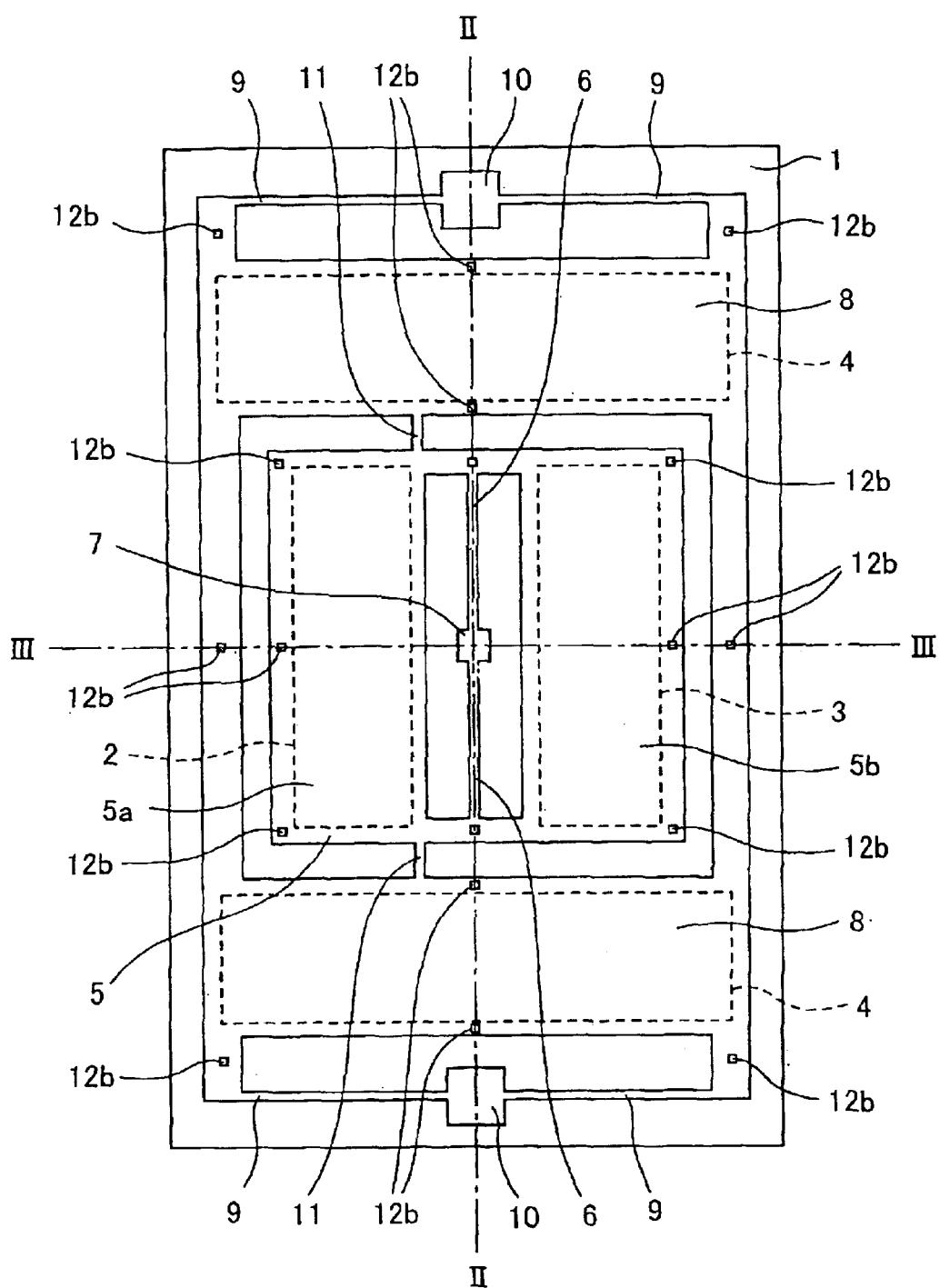
FIG. 1 is a plan view of an acceleration sensor according to Embodiment 1 of the invention.
Figure 2:
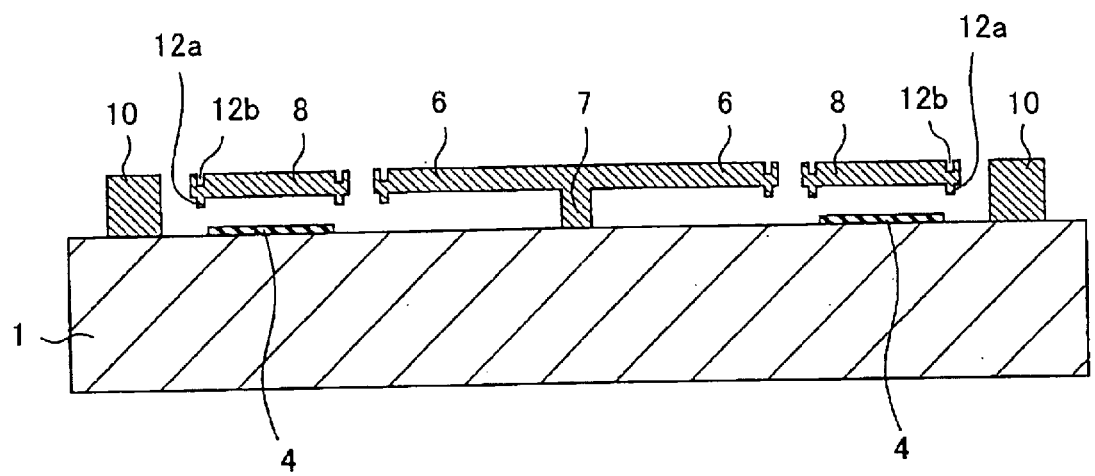
FIG. 2 is a diagram showing a sectional structure of the acceleration sensor according to Embodiment 1 of the invention and is a sectional view taken at a line II—II in FIG. 1.
Figure 3:
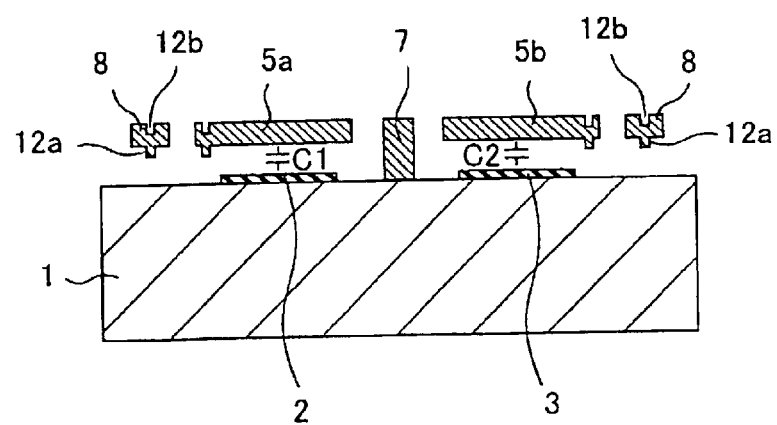
FIG. 3 is a diagram showing a sectional structure of the acceleration sensor according to Embodiment 1 of the invention and is a sectional view taken at a line III—III in FIG. 1.

FIG. 1 is a plan view of an acceleration sensor according to Embodiment 1 of the invention. FIGS. 2 and 3 are sectional views taken along lines II—II and III—III, respectively, in FIG. 1. A construction of the acceleration sensor according to Embodiment 1 of the invention will be described with reference to these diagrams. A reference numeral 1 indicates a silicon substrate. An insulating film is preferably provided on the surface. The insulating film is not shown for a simple description. A low-stress silicon nitride film deposited by LPCVD is suitable for the insulating film. A first fixed electrode 2, a second fixed electrode 3 and a self-diagnosis electrode 4 are provided on the silicon substrate 1. The first fixed electrode 2, second fixed electrode 3 and self-diagnosis electrode 4 can be formed simultaneously by etching a polysilicon film deposited by LPCVD method, for example.

A reference numeral 5 is a movable electrode. The movable electrode 5 is placed above the first fixed electrode 2 and the second fixed electrode 3 by spacing from and facing against them. The movable electrode 5 is linearly symmetrical with respect to its center line II—II. One side (region 5$a$ on the left side) of the movable electrode 5 faces against the first fixed electrode 2. The other side (region 5$b$ on the right side) faces against the second fixed electrode 3.

A reference numeral 6 indicates a torsion bar. The torsion bar 6 is provided on the center line II—II of the movable electrode 5. By opening the periphery of the part to be the torsion bar 6, the movable electrode 5 and the torsion bar 6 can be integrally formed.

The movable electrode 5 is elastically supported on the silicon substrate 1 by the torsion bar 6 through an anchor 7. The movable electrode 5 is adapted to swing with respect to the torsion bar 6. With this construction, the capacitance C1 constituted by the first fixed electrode 2 and the movable electrode 5, and the capacitance C2 constituted by the second fixed electrode 3 and the movable electrode 5 form a differential capacitance.

A reference numeral 8 indicates a mass. The mass 8 is placed above the self-diagnosis electrode 4 by spacing from and facing against this. The mass 8 surrounds the movable electrode 5 by spacing from the movable electrode 5.

The mass 8 is elastically supported on the silicon substrate 1 by a supporting bar 9 through an anchor 10. The mass 8 is adapted to be movable in accordance with the acceleration in a direction of thickness of the silicon substrate 1.

A reference numeral 11 indicates a link bar physically linking the movable electrode 5 and the mass 8. The movable electrode 5 and the mass 8 are linked by the link bar 11 on only one of two sides with respect to the center line of the movable electrode at a position spaced from the center line II—II of the movable electrode by a predetermined distance. In the example in FIG. 1, only the left side region 5a of the movable electrode 5 is linked by the link bar 11. The movable electrode 5 and the mass 8 are linked at two points on opposite sides of the movable electrode. The distances from the center line of the movable electrode 5 to link bars are equal. The link bar 11 is located closer to the center line than to the end of the movable electrode 5.

Each reference numeral 12a indicates a slight projection projected to the silicon substrate 1 side of the movable electrode 5 and the mass 8. Reference numeral 12b indicates a depression on the surface opposite to the surface having the projections 12a there on, provided by forming of the projection 12a.

An example of a method of manufacturing an acceleration sensor according to Embodiment 1 with this construction will be described.

First of all, the first fixed electrode 2, the second fixed electrode 3 and the self-diagnosis electrode 4 are formed on the silicon substrate 1. These electrodes can be formed simultaneously by etching a polysilicon film deposited by LPCVD method, for example.

Next, a PSG film or the like is formed as a sacrifice layer. The sacrifice layer is processed in a desired depression-projection form. The depression-projection form can be obtained by repeatedly forming a mask on the sacrifice layer and etching the sacrifice layer.

Then, a polysilicon film is formed. The polysilicon film is patterned in a desired form. Then, by etching and removing the sacrifice layer selectively, an acceleration sensor shown in FIG. 1 is obtained. Desirably, the polysilicon film to be used is of a low stress and does not have a distribution of stress in the thickness direction. The thickness is about 2 to 4 μm typically.

In producing the acceleration sensor by using this method, the distance between the first fixed electrode 2 and second fixed electrode 3 and the movable electrode 5 can be designed arbitrarily and thus, the capacitances C1 and C2 can be changed easily, by changing the thickness of the sacrifice film to be formed. By changing the depth of each depression of the sacrifice layer at a position corresponding to the mass 8, the thickness of the mass 8, that is, the weight can be designed arbitrarily.

Furthermore, in order to form the movable electrode 5, torsion bar 6, link bar 11, mass 8, supporting bar 9 and anchors 7 and 10, a polysilicon films can be deposited and etched collectively. Also in order to form the first fixed electrode 2, second fixed electrode 3 and self-diagnosis electrode 4, a polysilicon film can be deposited and etched collectively. What is needed is only to process a polysilicon film deposited on the silicon substrate 1, no cementing multiple substrates is not required, and therefore, the number of manufacturing steps is reduced and the mass production is also possible. Therefore, the manufacturing costs may be reduced significantly. Furthermore, the size can be reduced.

All of the movable portions including the movable electrode 5, torsion bar 6, link bar 11, mass 8 and supporting bar 9 may be formed by using a polysilicon film. As a result, the mass of the movable portions can be reduced significantly. Even when an excessive acceleration is applied, the sensor structure is hard to destroy. Therefore, the impact resistance can be improved.

As described above, in the acceleration sensor according to Embodiment 1 of the invention, the size of the first fixed electrode 2 and the second fixed electrode 3 is 250 μm×50 μm typically. A distance between the first electrode 2 and second fixed electrode 3 and the movable electrode 5 is 2 μm typically. In this case, the initial values of the capacitances C1 and C2 may be about 0.55 pF.

Figure 4:
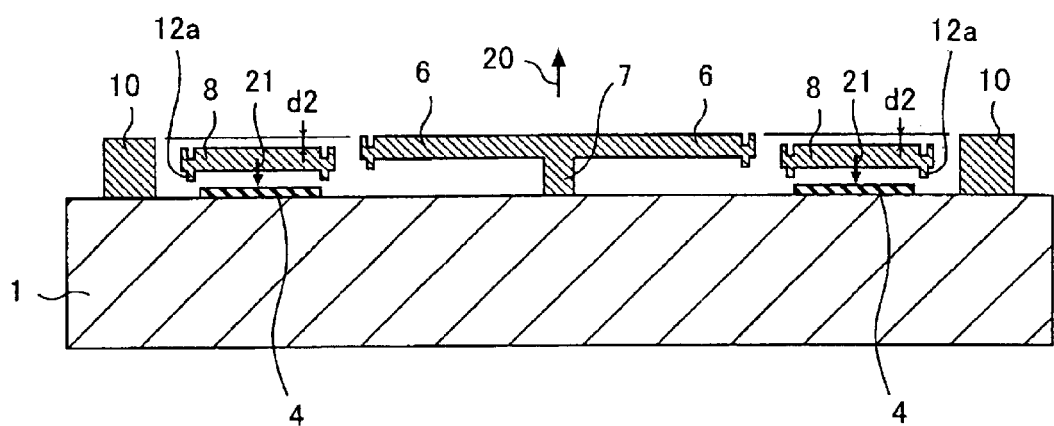
FIG. 4 is a diagram showing an operation state of the acceleration sensor according to Embodiment 1 of the invention when an acceleration is applied and is a sectional view taken at the line II—II in FIG. 1.
Figure 5:
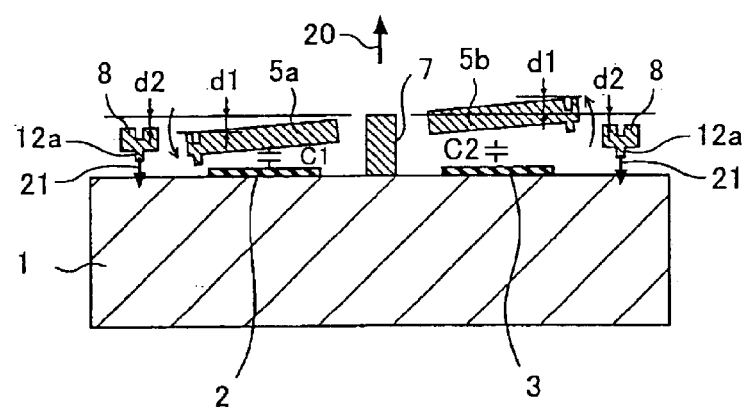
FIG. 5 is a diagram showing an operation state of the acceleration sensor according to Embodiment 1 of the invention when an acceleration is applied and is a sectional view taken at the line III—III in FIG. 1.
Figure 6:
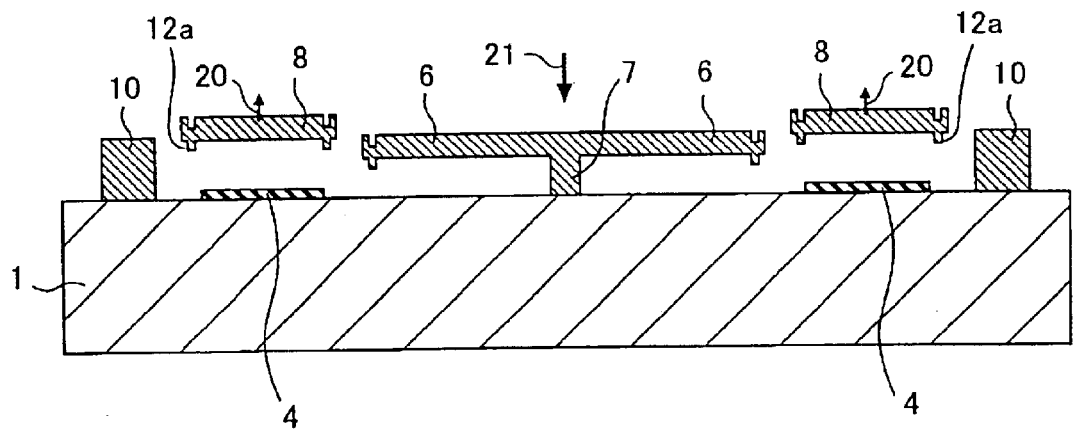
FIG. 6 is a diagram showing an operation state of the acceleration sensor according to Embodiment 1 of the invention when an acceleration is applied and is a sectional view taken at the line II—II in FIG. 1.
Figure 7:
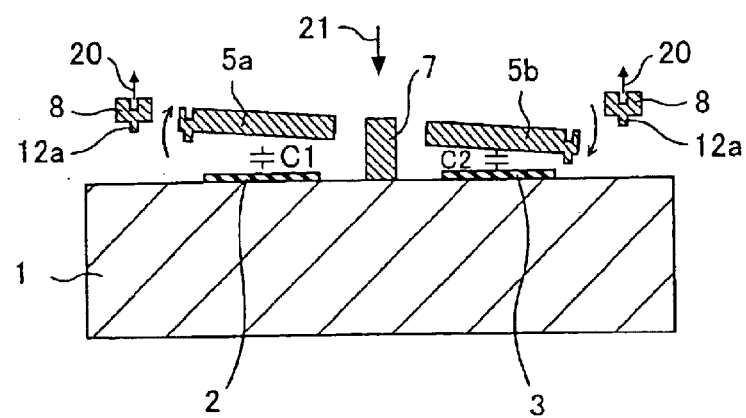
FIG. 7 is a diagram showing an operation state of the acceleration sensor according to Embodiment 1 of the invention when an acceleration is applied and is a sectional view taken at the line III—III in FIG. 1.

Next, the principle of acceleration detection will be described with reference to FIGS. 4 and 7. FIGS. 4 and 5 are diagrams each showing an operation state when an acceleration is applied in a direction (indicated by an arrow 20) perpendicular to the surface of the silicon substrate. FIGS. 4 and 5 are-sectional views along lines II—II and III—III, respectively, in FIG. 1. FIGS. 6 and 7 are diagrams each showing an operation state when an acceleration is applied in a direction (indicated by an arrow 21) perpendicular to the surface of the silicon substrate surface. FIGS. 6 and 7 are sectional views taken at the line II—II and III—III, respectively, in FIG. 1.

As shown in FIGS. 4 and 5, when an acceleration is applied in the direction (indicated by the arrow 20) perpendicular to the silicon substrate 1, an inertia force acts on the mass 8. Since the mass 8 is elastically supported by the supporting bar 9 so as to move in the direction perpendicular to the silicon substrate 1, the mass 8 displaces in the direction (indicated by the arrow 21) opposite to that of the applied acceleration due to the inertia force. As the movable electrode 5 is physically linked with the mass 8 through the link bar 11 on the-left side of the center line II—II, due to the downward displacement of the mass 8, the left side region 5a of the movable electrode 5 is also pressed downward. The movable electrode 5 is elastically supported by the torsion bar 6. Therefore, when the left side region 5a is displaced downward, the right side region 5b displaces upward like a seesaw. The inter electrode distance is reduced due to the twist-vibration of the movable electrode 5. Therefore, the capacity value of the capacitance C1 generated between the first fixed electrode 5 and the left side region 5a of the movable electrode 5 is increased. On the other hand, the capacity value of the capacitance C2 generated between the second fixed electrode 3 and the right side region 5b of the movable electrode 5 is reduced because the inter electrode distance is increased. By differentially detecting the changes in the capacitances C1 and C2, the applied acceleration can be measured.

In the acceleration sensor according to Embodiment 1, the link bar 11 linking the movable electrode 5 and the mass 8 is provided at the middle part of the movable electrode 5. As shown in FIGS. 4 and 5, the displacement amount d1 at the end of the movable electrode 5 can be made larger than the displacement amount d2 of the mass 8 when an acceleration is applied. In other words, a large detected capacity change can be obtained by a small displacement of the mass 8. Therefore, an acceleration sensor for detecting an acceleration with high sensitivity can be obtained without decreasing the rigidity of the torsion bar 6 more than necessary. Therefore, the reliability can be also improved.

When the direction of an applied acceleration is opposite to the above-described direction, the displacement direction of the mass 8, the twist direction of the movable electrode 5 and the changes in the capacitances C1 and C2 are only inverted from those described above as shown in FIGS. 6 and 7. Apparently, an acceleration can be measured in the same manner.

As shown in FIG. 1, by arranging the torsion bar 6 and the supporting bar 9 to intersect each other, the mass 8 and the movable electrode 5 can be adapted not to move against the acceleration in a direction horizontal to the silicon substrate 1. In other words, the sensitivity to accelerations with respect to the other axes, which are not desirable for the sensor, can be prevented.

Since the movable electrode 5 is surrounded by the mass 8 to make the center of gravity of both of them coincident, the balance of the movable electrode 5 can be maintained at the initial state. Thus, the same initial capacity value of the detecting capacitances C1 and C2 can be obtained. Therefore, the precision in measurement can be stabilized, and the calibration step can be easier.

Next, a self-diagnosis function will be described. The self-diagnosis electrode 4 is provided on the silicon substrate 1 facing against the mass 8. By applying voltage between the self-diagnosis electrode 4 and the mass 8, electrostatic gravity is caused between them. Thus, the mass 8 can be displaced downward as shown in FIGS. 4 and 5. By forcibly displacing the mass 8 in this way even when an acceleration is not applied, the left side region 5a of the movable electrode 5 linked with the mass 8 through the link bar 11 is displaced downward. The right side region Sb of the movable electrode 5 is displaced upward. As a result, in the same manner as the case when an acceleration is applied, the capacitance changes can be caused in the capacitances C1 and C2. By detecting capacitance changes caused in this way, the function can be self-diagnosed regarding whether the acceleration sensor according to the invention is destroyed or not, whether the characteristic changes or not and so on.

In order to improve the characteristic and reliability of the acceleration sensor, the acceleration sensor according to this embodiment has following devices.

The first point is that the torsion bar 6 and the supporting bar 9 intersect as shown in FIG. 1. Thus, the sensitivity to acceleration within the plain of the silicon substrate, which is not desirable for sensors, that is, the sensitivity to accelerations with respect to the other axes can be suppressed.

The second point is that the projections 12a are located properly as shown in FIGS. 1 to 7. Thus, the movable electrode 5 and the mass 8 are prevented from adhering to the silicon substrate 1 at a step of removing a sacrifice layer in manufacturing processing. Furthermore, even when an excessive acceleration is applied and the movable electrode 5 twists significantly, the movable electrode 5 is prevented from touching the first fixed electrode 2 or the second fixed electrode 3, which might result in a short circuit. These projections 12a can be formed easily by forming depressions in advance on a sacrifice layer before a polysilicon film is deposited there above on which the movable electrode 5 and the mass 8 will be formed.

Embodiment 2

Figure 8:
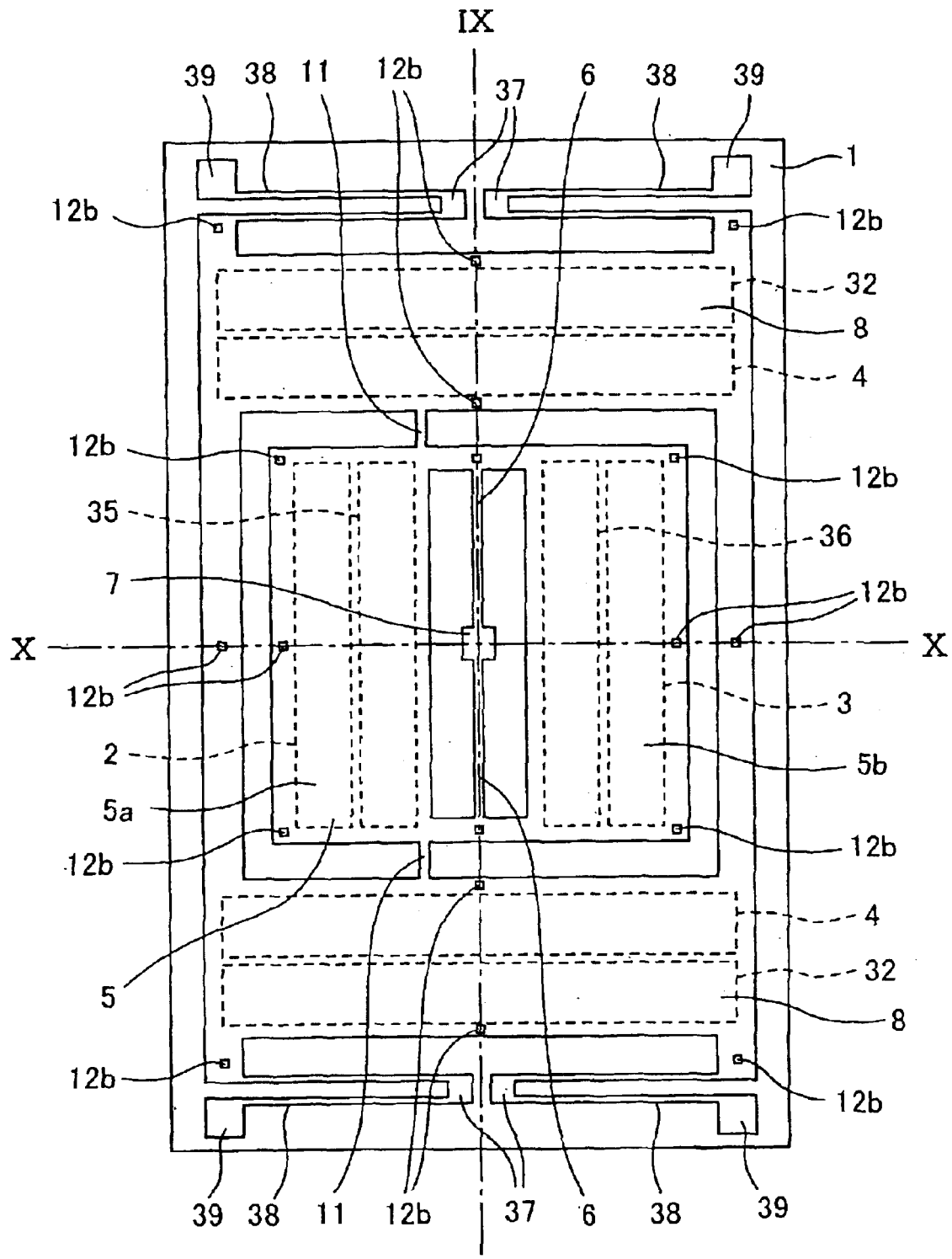
FIG. 8 is a plan view of an acceleration sensor according to Embodiment 2 of the invention.
Figure 9:
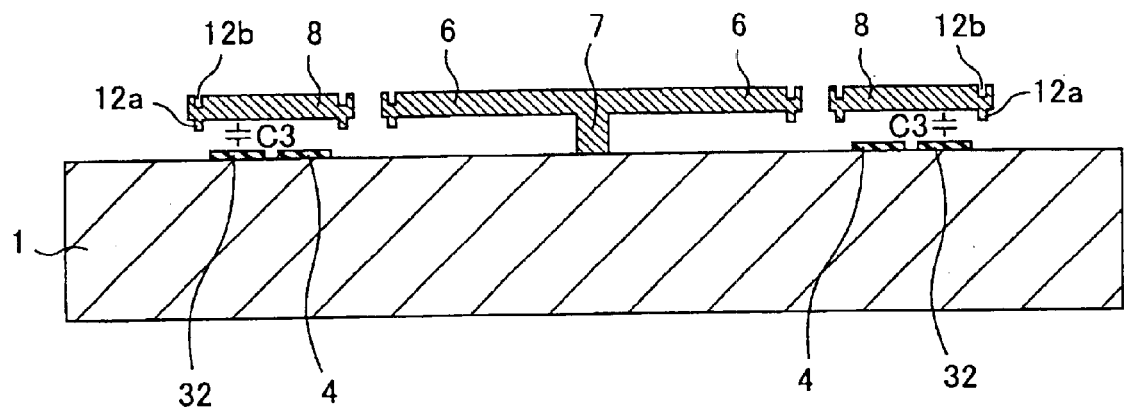
FIG. 9 is a diagram showing a sectional construction of the acceleration sensor according to Embodiment 2 of the invention and is a sectional view taken at a line IX—IX in FIG. 8.
Figure 10:
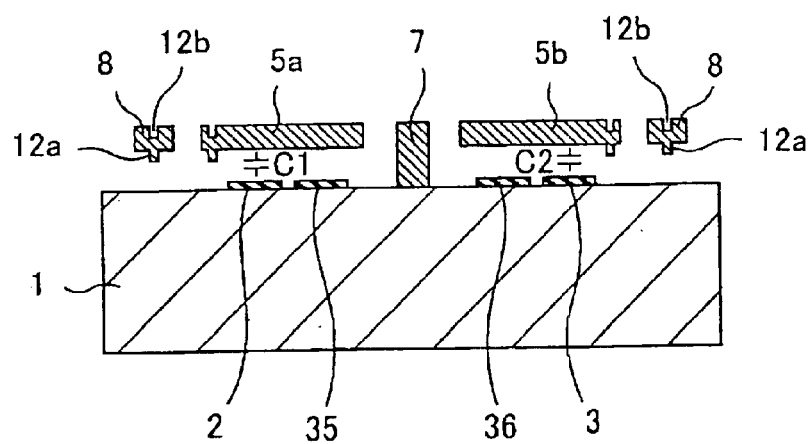
FIG. 10 is a diagram showing a sectional structure of the acceleration sensor according to Embodiment 2 of the invention and is a sectional view taken at a line X—X in FIG. 8.

FIG. 8 is a plan view of an acceleration sensor according to Embodiment 2 of the invention. FIGS. 9 and 10 are sectional views taken along lines IX—IX and X—X, respectively, in FIG. 8.

Embodiment 2 is characterized in that a correcting electrode 32 is provided by the side of a self-diagnosis electrode 4 provided on a silicon substrate 1 by facing against a mass 8, in that driving electrodes 35 and 36 are provided near a first fixed electrode 2 and a second fixed electrode 3 provided on the silicon substrate 1 by facing against a movable electrode. 5, and in that a supporting bar 38 having a bending portion 37 is provided as a supporting bar for elastically supporting the mass 8 with respect to the silicon substrate 1 and the supporting bar 38 elastically supports the mass 8 with respect to the silicon substrate 1 through an anchor 39.

In FIGS. 8 to 10, the same reference numerals as those shown in FIGS. 1 to 7 indicate the same elements as those according to Embodiment 1 or equivalent elements.

The correcting electrode 32 is an electrode provided for compensating a characteristic change due to a temperature change or the like. When a temperature of an environment in which the acceleration sensor is used changes, a warp occurs due to a difference in thermal expansion coefficients between members included in the acceleration sensor. As a result, capacitances C1 and C2 may change. A change in the capacitances C1 and C2 and a change in a capacitance C3 provided by the mass 8 and the movable electrode 5 have the same tendency in many cases. Therefore, by detecting a change in the capacitance C3, the changes in capacitances C1 and C2 can be corrected based on the change in the capacitance C3.

Figure 11:
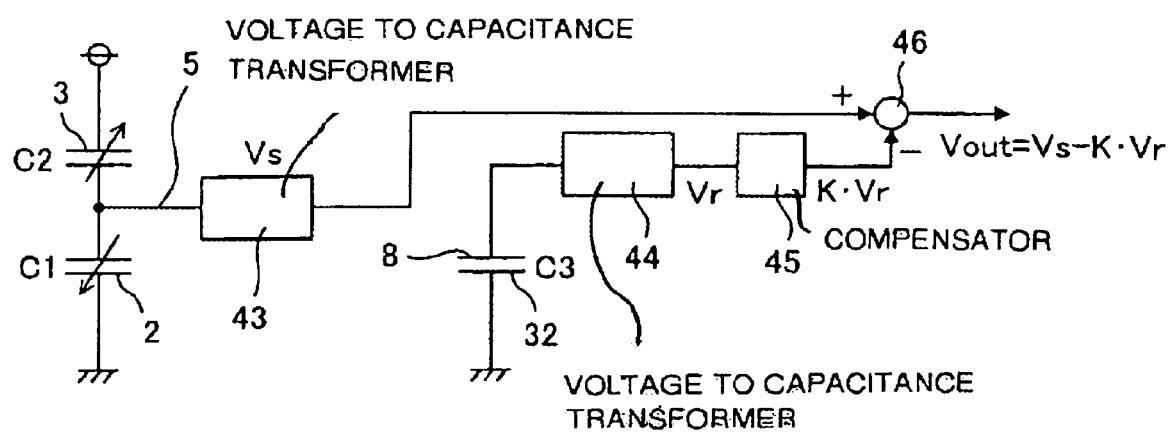
FIG. 11 is a block diagram of a correction circuit in the acceleration sensor according to Embodiment 2 of the invention.

FIG. 11 is a block diagram of a correction circuit in the acceleration sensor according to Embodiment 2 of the invention.

As shown in FIG. 11, an output value Vs resulted from conversion of changes in capacitances C1 and C2 to voltages by a first capacitance voltage converter 43 and an output value Vr resulted from conversion of a change in the capacitance C3 to voltages by a second capacitance voltage converter 44 are computed by using a voltage processor 46 so as to obtain:

$$V_{out} = V_s - K \cdot V_r$$

Thus, the output value Vout can be obtained from which only the change amount is removed. Here, K is a correcting coefficient.

In this way, by providing the correcting electrode 32 facing against the mass 8 on the substrate 1, the change in characteristic due to a temperature change, for example, of an environment in use can be corrected. Therefore, an error in acceleration obtained in-the environment in use can be prevented.

The driving electrodes 35 and 36 are electrodes each used for suppressing twists of the movable electrode 5 and used when the present acceleration sensor is used as that servo type. In other words, when the movable electrode 5 twists with respect to the torsion bar 6 due to an applied acceleration and the capacitances C1 and C2 are unbalanced, the unbalance amount are returned as a feedback. Then, a voltage corresponding to the unbalance amount is applied to the driving electrode 35 or driving electrode 36. Thus, the twist of the movable-electrode 5 is returned to the original balanced state by electrostatic gravity caused between the movable electrode 5 and the driving electrode 35 or driving electrode 36. The acceleration can be obtained based on the voltage applied to the driving electrode 35 or driving electrode 36 in order to return to the balanced position.

By using the acceleration as such of a servo type acceleration sensor, malfunctions or breakage caused by the contact of the movable electrode 5 with the silicon substrate 1 can be prevented. Thus, the reliability can be improved.

Furthermore, by using the bending bar 38 having a bending portion 37 as a supporting bar as described above, the axial force imposed on the supporting bar can be reduced even when a residual stress of the polysilicon film exists. Therefore, the buckling can be prevented.

Embodiment 3

Figure 12:
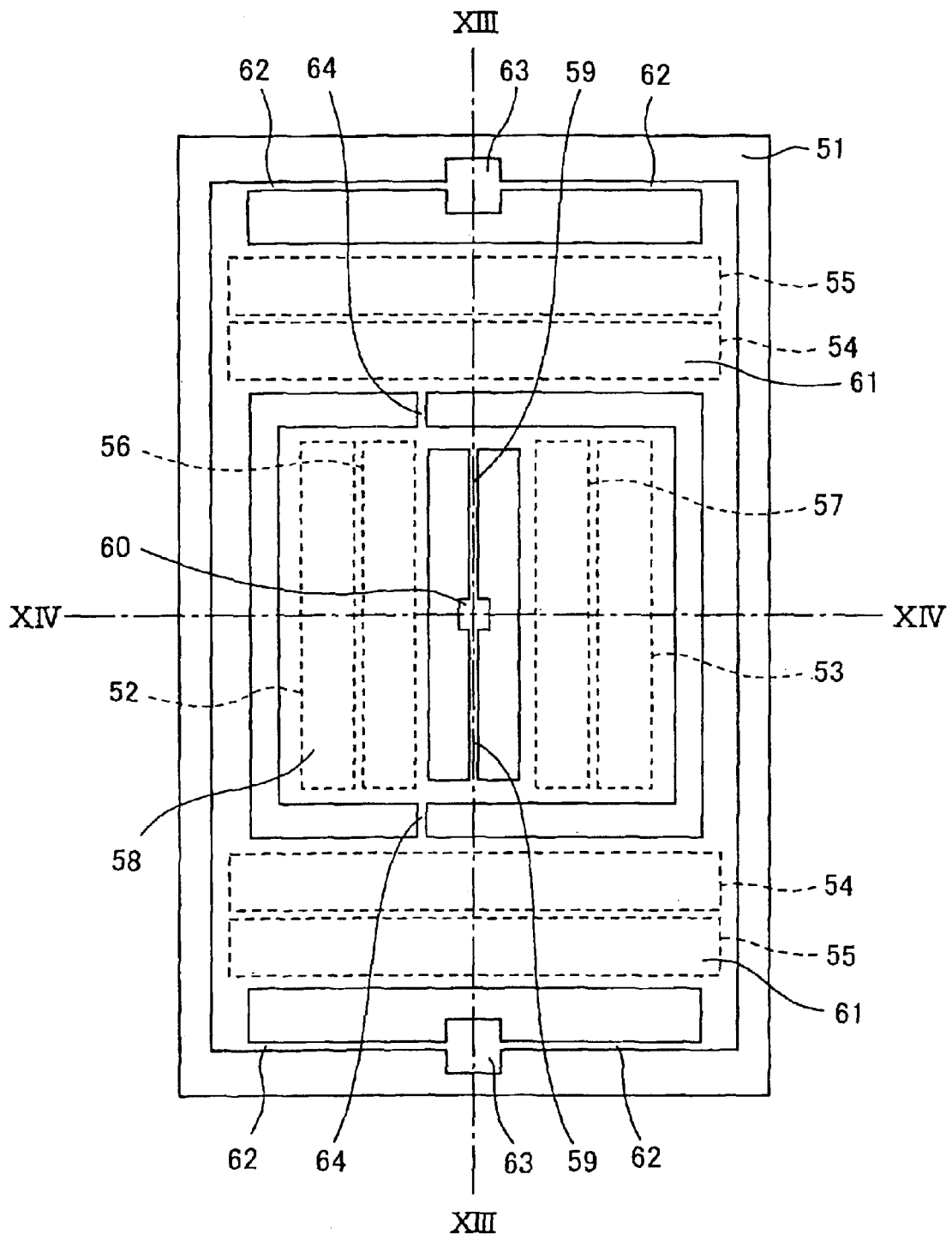
FIG. 12 is a plan view of an acceleration sensor according to Embodiment 3 of the invention.
Figure 13:
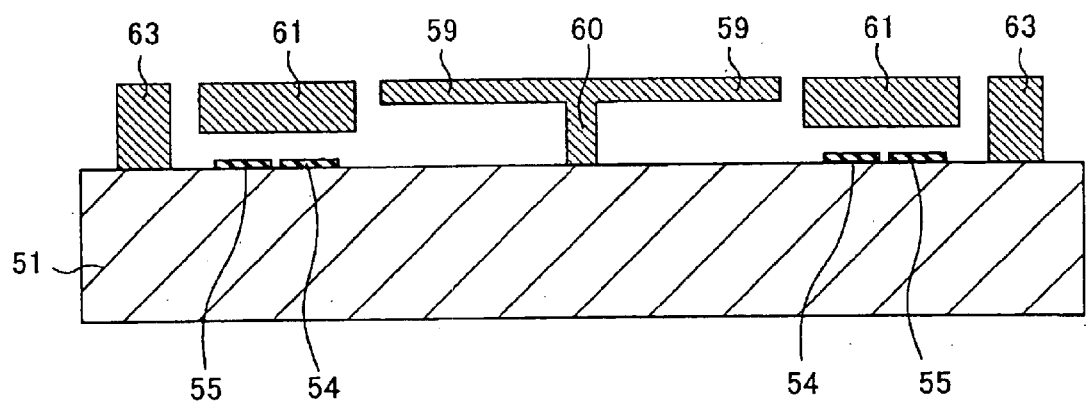
FIG. 13 is a diagram showing a sectional structure of the acceleration sensor according to Embodiment 3 of the invention and is a sectional view taken at a line XIII—XIII in FIG. 12.
Figure 14:
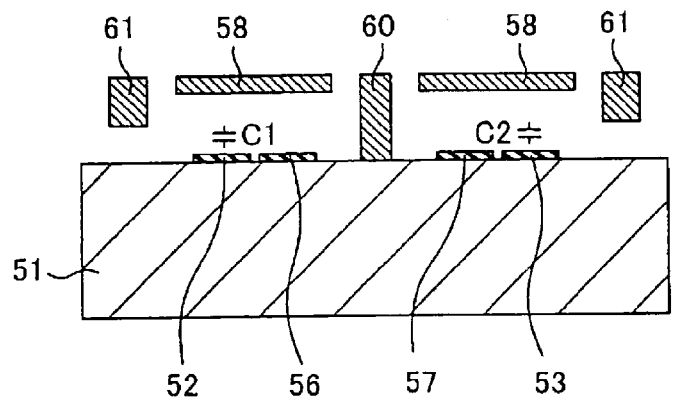
FIG. 14 is a diagram showing a sectional structure of the acceleration sensor according to Embodiment 3 of the invention and is a sectional view taken at a line XIV—XIV in FIG. 12.

FIG. 12 is a plan view of an acceleration sensor according to Embodiment 3 of the invention. FIGS. 13 and 14 are sectional diagrams taken along lines XIII—XIII and XIV—XIV, respectively, in FIG. 12.

In Embodiments 1 and 2, various electrodes are formed on the silicon substrate 1 by using a polysilicon film. Embodiment 3 is different from Embodiments 1 and 2 largely in that the various electrodes are formed of a metal thin film or monocrystal silicon on a glass substrate.

In FIGS. 12 to 14, a reference numeral 51 indicates a glass substrate. A first fixed electrode 52, a second fixed electrode 53, a self-diagnosis electrode 54, a correcting electrode 55 and driving electrodes 56 and 57 made of a metal thin film such as that of aluminum and gold are provided on the glass substrate 51. A movable electrode 58 is provided above the first fixed electrode 52, the second fixed electrode 53 and the driving electrodes 56 and 57 by being spaced from and facing against them. The movable electrode 58 is elastically supported on the glass substrate 51 by a torsion bar 59 through an anchor 60. Thus, the movable electrode 58 can swing with respect to the torsion bar 59. A mass 61 is located above the self-diagnosis electrode 54 and the correcting electrode 55 by spacing from and facing against them. The mass 61 is elastically supported on the glass substrate 51 by the supporting bar 62 through the anchor 63. The mass 61 can move in accordance with the acceleration in a direction perpendicular to the substrate surface of the glass substrate 51. Furthermore, the mass 61 is physically linked with the movable electrode 58 through the link bar 64.

The movable electrode 58, torsion bar 59, mass 61, supporting bar 62, link bar 64 and anchors 60 and 63 are integrally formed by monocrystal silicon.

An example of a method of manufacturing the acceleration sensor according to Embodiment 3 with this construction will be described.

First of all, the first fixed electrode 52, second fixed electrode 53, self-diagnosis electrode 54, correcting electrode 55 and driving electrodes 56 and 57 are formed on the glass substrate 51. These electrodes can be formed simultaneously by depositing and etching metal thin films collectively.

Next, a monocrystal silicon substrate is processed so that the movable electrode 58, torsion bar 59, mass 61, supporting bar 62, link bar 64 and anchors 60 and 63 can be formed. A mask is formed on the back surface side of the monocrystal silicon substrate in the positions corresponding to the anchors 60 and 63. Then, the monocrystal silicon substrate is etched. This etching is continued by using Deep Reactive Ion Etching method (DRIE method), for example, until the thickness of the monocrystal silicon substrate to be etched, that is, until the thickness of the mass reaches to a desired thickness.

Next, a mask is formed on the back side of the parts, of the monocrystal silicon substrate in the positions, corresponding to the anchors 60 and 63 and the mass 61. Then, the monocrystal silicon substrate is etched. This etching is continued by using DRIE method, for example, until the thickness of the monocrystal substrate to be etched, that is, until the thickness of the movable electrode 58 reaches to a desired thickness.

Next, after removing the mask, the back side of the anchors 60 and 63 is pasted on the glass substrate. A mask is formed on a front side of the parts corresponding to the movable electrode 58, torsion bar 59, mass 61, supporting bar 62, link bar 64, and anchors 60 and 63. The monocrystal silicon substrate is etched through from the front side. Thus, these components can be formed, and the acceleration sensor according to Embodiment 3 can be obtained.

In this way, the acceleration sensor according to Embodiment 3 can be produced by forming the movable electrode 58, torsion bar 59, mass 61, supporting bar 62, link bar 64 and anchors 60 and 63 by processing a single monocrystal substrate.

In this way, etching is performed in two steps such that the mass 61 can be thick and the movable electrode 58 can be thin. Thus, the mass of the mass 61 can be large. Therefore, the sensitivity can be improved. Additionally, the distance between the movable electrode 58 and the glass substrate 51 can be large. Therefore, the movable electrode 58 is hard to touch the glass substrate 51. As a result, the impact resistance and reliability can be improved.

The acceleration sensor according to Embodiment 3 can be easily manufactured. Additionally, the thickness of the movable electrode and mass can be adjusted easily. The flexibility in designing the acceleration sensor can be improved such as arbitrarily setting a mass of the mass and a capacitance.

The etching has been described to be a two-step process, however, the etching may be performed in one step. In this case, the thickness of the mass 61 becomes same with that of movable electrode 58. Therefore, the manufacturing process can be simplified advantageously.

Embodiment 4

Figure 15:
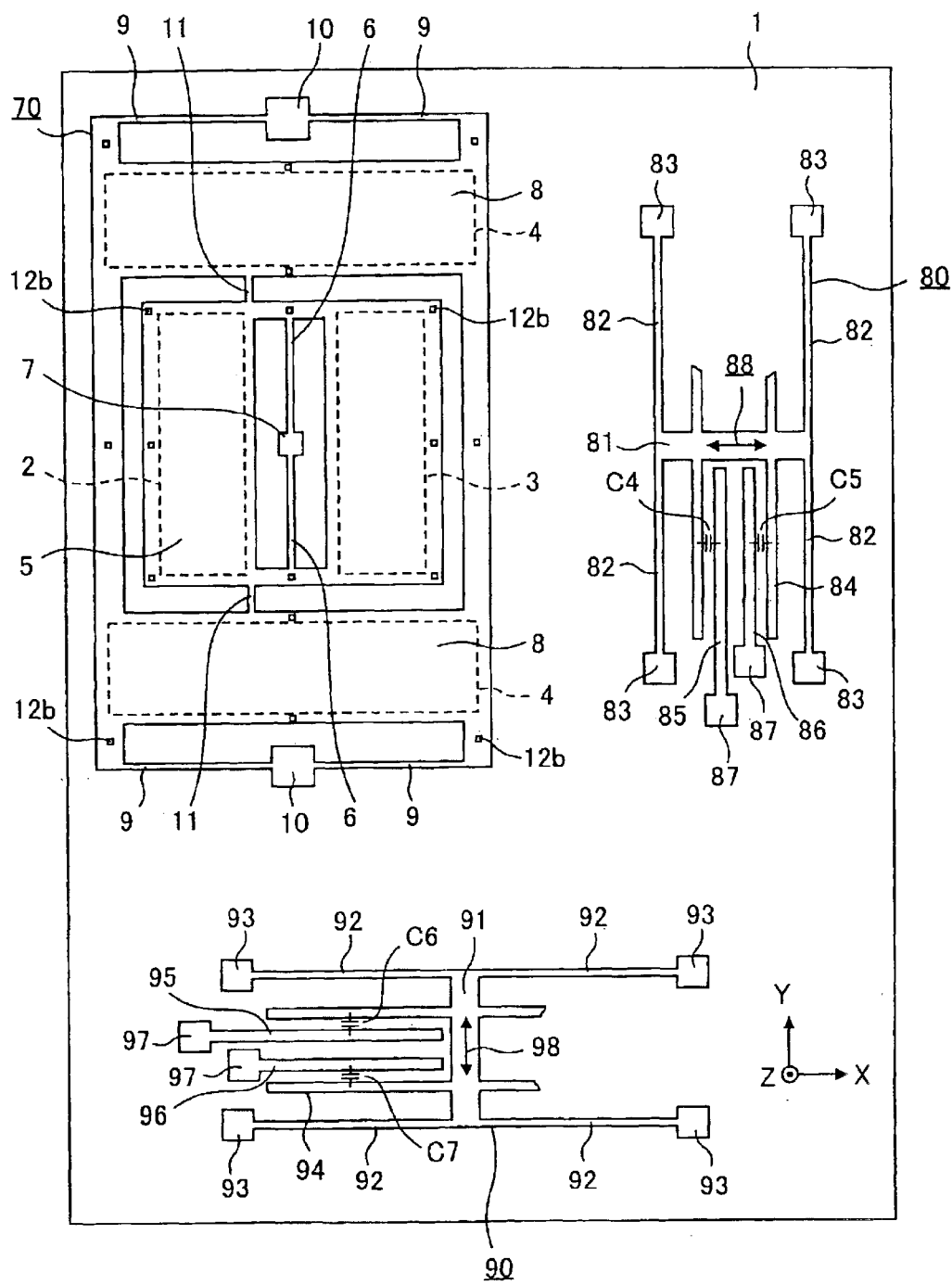
FIG. 15 is a plan view of an acceleration sensor according to Embodiment 4 of the invention.
Figure 16:
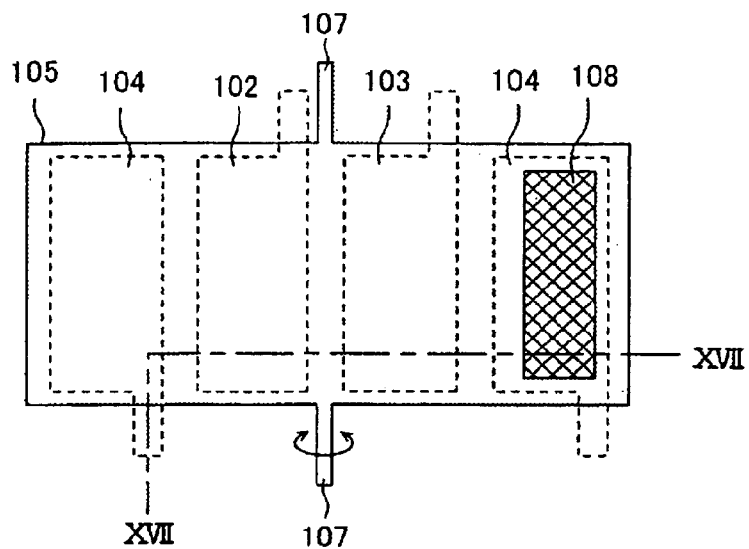
FIG. 16 is a plan view of a conventional acceleration sensor.
Figure 17:
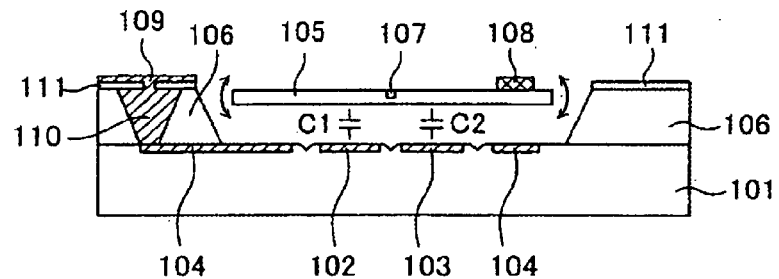
FIG. 17 is a sectional view of the conventional acceleration sensor and is a sectional view taken at a line XVII—XVII in FIG. 16.
Figure 18:
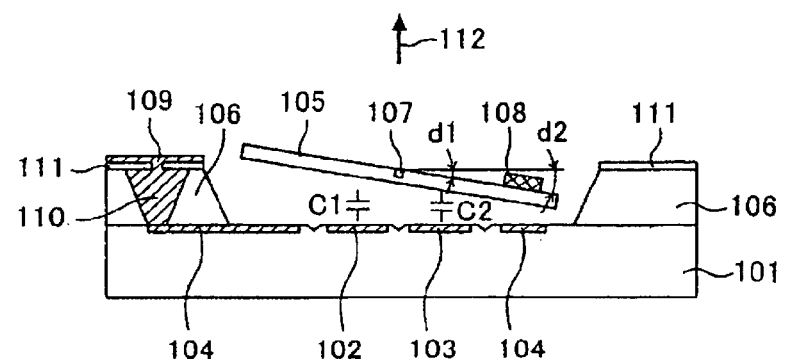
FIG. 18 is a sectional view of the conventional acceleration sensor, which is taken at a line XVII—XVII in FIG. 16 and which shows an operation state when an acceleration is applied.

FIG. 15 is a plan view of an acceleration sensor according to Embodiment 4 of the invention.

The acceleration sensor according to Embodiment 4 includes the acceleration sensor for detecting an acceleration in a direction perpendicular to the substrate surface of the silicon substrate 1 described in Embodiment 1 and a second and a third acceleration sensors each for detecting an acceleration in a direction of the inside of the surface of the silicon substrate 1.

In FIG. 15, a reference numeral 70 indicates a first acceleration sensor for detecting an acceleration in a direction (Z-axis direction) perpendicular to the silicon substrate 1. A reference numeral 80 indicates a second acceleration sensor for detecting an acceleration in a direction (X-axis direction) horizontal to the silicon substrate 1. A reference numeral 90 indicates a third acceleration sensor for detecting an acceleration in a direction (Y-axis direction) horizontal to the silicon substrate 1 and orthogonal to the X-axis direction. In FIG. 15, the same reference numerals in FIGS. 1 to 7 indicate the same or equivalent components as those in Embodiment 1.

The same one as the acceleration sensor according to Embodiment 1 is used as the first acceleration sensor 70. Alternatively, the acceleration sensor according to Embodiment 2 or 3 may be used as the first acceleration sensor 70.

Next, the second acceleration sensor 80 will be described.

A reference numeral 81 indicates a mass. Four supporting bars 82 extending in a direction perpendicular to the X-axis are connected to both ends of the mass 81. These supporting bars 82 are spaced from and are provided above the silicon substrate 1. These supporting bars 82 are fixed on the silicon substrate by an anchor 83. The mass 81 is elastically supported on the silicon substrate 1 by using the supporting bar 82. The mass 81 displaces in response to an acceleration in the X-axis direction (indicated by an arrow 88). The mass 81 has many comb-form movable electrodes 84 extending in a direction perpendicular to the X-axis. Here, only few of them are illustrated for simplification.

Fixed electrodes 85 and 86 are provided by facing against these comb-form movable electrodes 84. Both of the fixed electrodes 85 and 86 are fixed on the silicon substrate 1 through an anchor 87. The fixed electrodes 85 and 86 are provided such that one of distances between the fixed electrodes 85 and 86 and the facing movable electrodes 84 can be smaller and the other distance can be larger when the mass 81 displaces in the X-axis direction.

The fixed electrode 85 and the movable electrode 84 constitute a capacitance C4. The fixed electrode 86 and the movable electrode 84 constitute a capacitance C5. A differential capacitance includes the capacitances C4 and C5 by having the movable electrode 84 in common.

By differentially detecting the changes in the capacitances C4 and C5, an applied acceleration in the X-axis direction can be measured.

Next, the third acceleration sensor 90 will be described. The third acceleration sensor 90 has the same construction as that of the second acceleration sensor except that a mass 91, a supporting bar 92, an anchor 93, a movable electrode 94, a fixed electrodes 95 and 96 in the third acceleration sensor 90 are located in a direction orthogonal to the second acceleration sensor.

A capacitance C6 is provided between the fixed electrode 95 and the movable electrode 94. A capacitance electrode C7 is provided between the fixed electrode 96 and the movable electrode 94. A differential capacitance includes the capacitances C6 and C7 by having the movable electrode 94 in common.

By differentially detecting the changes in the capacitances C6 and C7, an applied acceleration in the Y-axis direction (indicated by an arrow 98) can be measured.

As described above, by providing a capacitance type acceleration sensor having a mass displaceable in response to accelerations in the X-, Y-Z-directions, which are orthogonal to each other, an acceleration sensor can be obtained for detecting accelerations in the three axis directions in one sensor chip.

Embodiment 5

Figure 19:
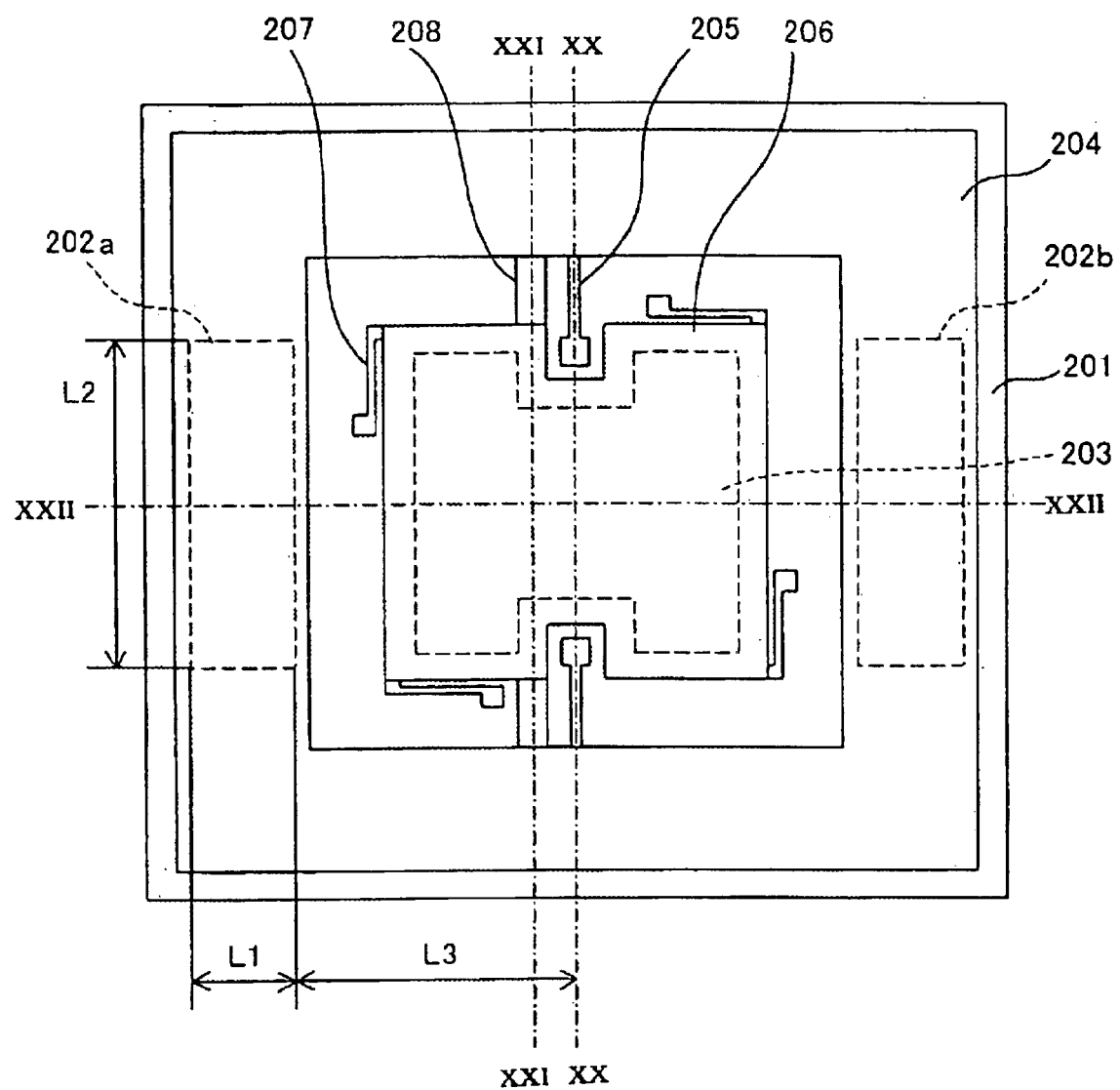
FIG. 19 is a plan view of an acceleration sensor according to Embodiment 5 of the invention.
Figure 20:
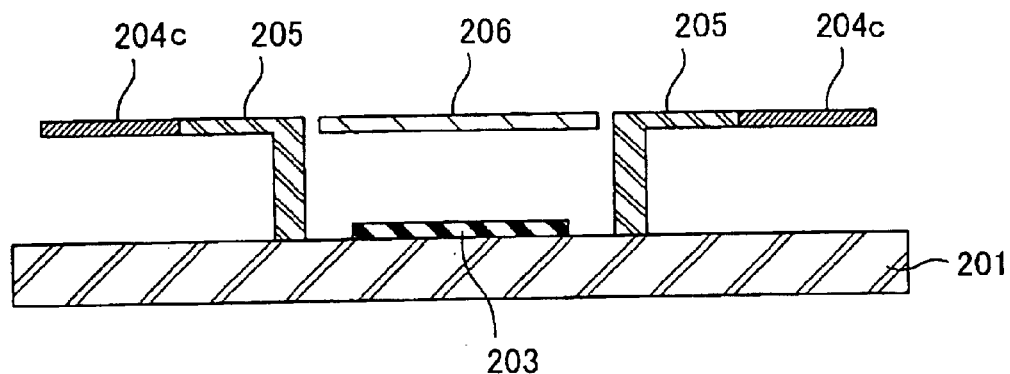
FIG. 20 is a diagram showing a sectional structure of the acceleration sensor according to Embodiment 5 of the invention and is a sectional view taken at a line XX—XX in FIG. 19.
Figure 21:
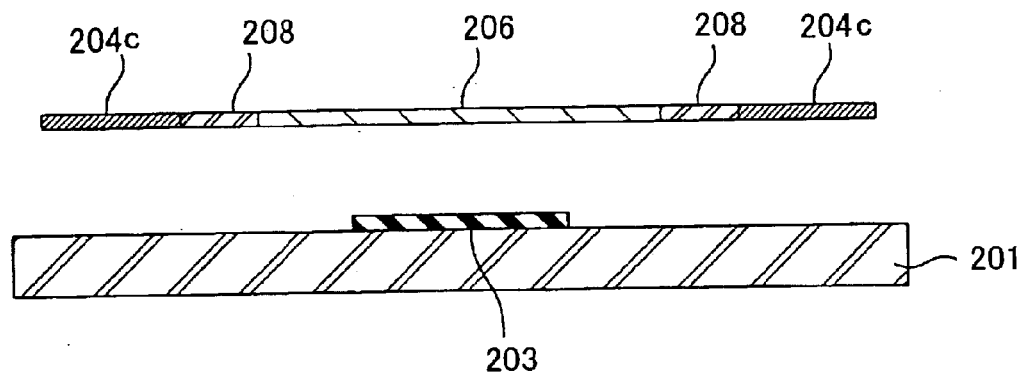
FIG. 21 is a diagram showing a sectional structure of the acceleration sensor according to Embodiment 5 of the invention and is a sectional view taken at a line XXI—XXI in FIG. 19.
Figure 22:
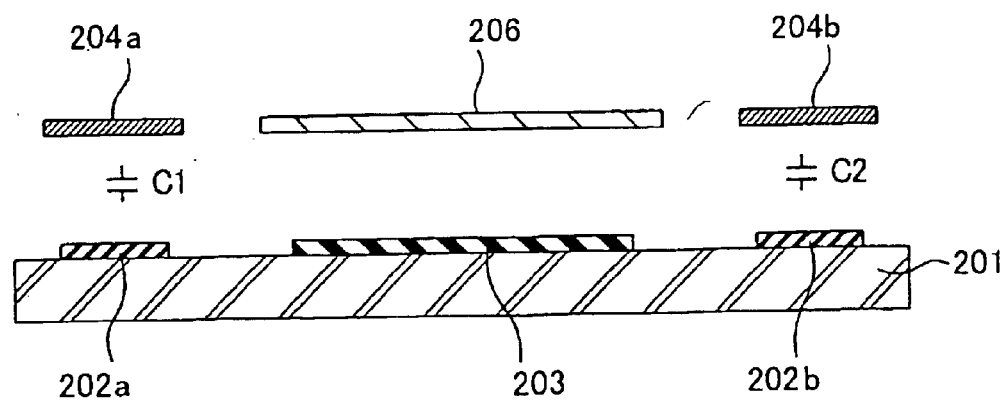
FIG. 22 is a diagram showing a sectional structure of the acceleration sensor according to Embodiment 5 of the invention and is a sectional view taken at a line XXII—XXII in FIG. 19.

FIG. 19 is a plan view for explaining Embodiment 5 of the acceleration sensor to which the present invention is applied. In addition, FIG. 20 is a sectional view taken at a line XX—XX in FIG. 19, FIG. 21 is a sectional view taken at a line XIX—XIX in the same figure, and FIG. 22 is a sectional view taken at a line XX—XX in the same figure.

In FIGS. 19 to 22, a first fixed electrode 202*a*, a second fixed electrode 202*b*, and a self-diagnosis electrode 203 are formed on a substrate 201 consisting of silicon. Preferably, the substrate 201 has an insulating film formed on a surface thereof. As this insulating film, a low-stress silicon nitride film or the like deposited by LPCVD is suitable. The first fixed electrode 202*a*, the second fixed electrode 202*b*, and the self-diagnosis electrode 203 can be formed collectively by, for example, etching a polysilicon thin film deposited by LPCVD on a silicon nitride film.

A movable electrode 204 spaced from the first fixed electrode 202*a* and the second fixed electrode 202*b*. This movable electrode 204 includes a first movable electrode portion 204*a*, a second movable electrode portion 204*b*, and a movable electrode portion linking portions 204*c*. The movable electrode 204 is preferably one highly rigid member. Note that the first movable electrode portion 204*a*, together with the first fixed electrode 202*a*, forms a first capacitance Cl, and the second movable electrode portion 204*b*, together with the second fixed electrode 202*b*, forms a second capacitance C2. Here, the first and second fixed electrodes 202*a* and 202*b* and the first and second movable electrode portions 204*a* and 204*b* are linearly symmetrical with respect to the line XX—XX, respectively. It is assumed that a width of the respective capacitance space is L1 and a length thereof is L2, and a distance from the line XX—XX to the respective capacitance space is L3. In addition, both ends of the first movable electrode portion 204*a* and the second movable electrode portion 204*b* are linked by the two movable electrode portion linking portions 204*c*. Moreover, the two movable electrode portion linking portions 204*c* are connected with each other and spaced apart from the substrate 201 by movable members 205, respectively, as shown in FIG. 19. Consequently, the movable electrode 204 is supported on the substrate 201. Here, the movable members 205 include a torsionally deformable torsion bar part and an anchor part for connecting the movable members 205 with the substrate 201. These two movable members 205 are arranged such that a torsion axis thereof is placed on the line XX—XX passing a middle point between the two movable electrode portions as shown in FIG. 19.

A mass 206 is arranged between the first movable electrode portion 204*a* and the second movable electrode portion 204*b* so as to be spaced apart from and face the self-diagnosis electrode 203. The mass 206 is plate-like and is elastically supported on the substrate 201 via mass supporting members 207. Here, the mass supporting members 207 include an elastic bar portion for elastically displacing the mass 206 and an anchor part for connecting the mass supporting members 207 with the substrate 201. The mass supporting members 207 are spaced apart from the substrate 201. In this way, the mass 206 is elastically supported. Thus, the mass 206 is displaced, in response to an acceleration applied in a thickness direction of the substrate 201, in a direction opposite to an acceleration by an action of an inertial force. In this case, the mass supporting members 207 are arranged around the mass 206 in a swastika shape as shown in FIG. 19. Since longitudinal parts of elastic bar portions of the mass supporting members 207 extend along sides of the mass 206, the mass supporting members 207 suppresses the mass 206 from being displaced in a direction horizontal to the substrate surface.

In addition, the two movable electrode portion linking portions 204*c* and the mass 206 are rigidly linked by link bars 208 serving as two mass linking members. The link bars 208 are arranged on the line XXI—XXI as shown in FIG. 19, and are parallel with and spaced from the movable members 205.

Note that the movable electrode 204, the movable members 205, the mass 206, the mass supporting members 207, and the link bars 208 can be formed collectively, by, for example, etching a polysilicon thin film deposited by LPCVE, epitaxial growth, or the like. This polysilicon film desirably has a low stress and does not have a distribution of stress in the thickness direction. A thickness thereof is typically about 4 to 10 μm. In addition, the gap between, for example, the fist fixed electrode 202*a* or the second fixed electrode 202*b* and the movable electrode 204 can be formed by selectively etching and removing a sacrifice layer such as a PSG thin film. A distance thereof can be designed arbitrarily by changing a thickness of the PSG thin film to be deposited.

In the acceleration sensor constituted as described above, when the mass 206 is displaced by the application of an acceleration, a part of the movable electrode portion linking portions 204*c* on the line XIX—XIX is displaced in association with the mass 206 via the link bars 208. On the other hand, a part of the movable electrode portion linking portions 204*c* on the line XVIII—XVIII is supported by the movable members 205 so as not to be displaced in the thickness direction of the substrate 201. Therefore, as the torsion bar parts of the movable members 205 are torsionally deformed, the movable electrode portion linking portions 204c incline. In accordance with the inclination, the first movable electrode portion 204a is displaced in the same direction as the mass 206, and the second movable electrode portion 204b is displaced in a direction opposite to the mass 206. Consequently, the first capacitance C1 and the second capacitance C2 change, and an acceleration can be measured from this change in capacitance.

Figure 23:
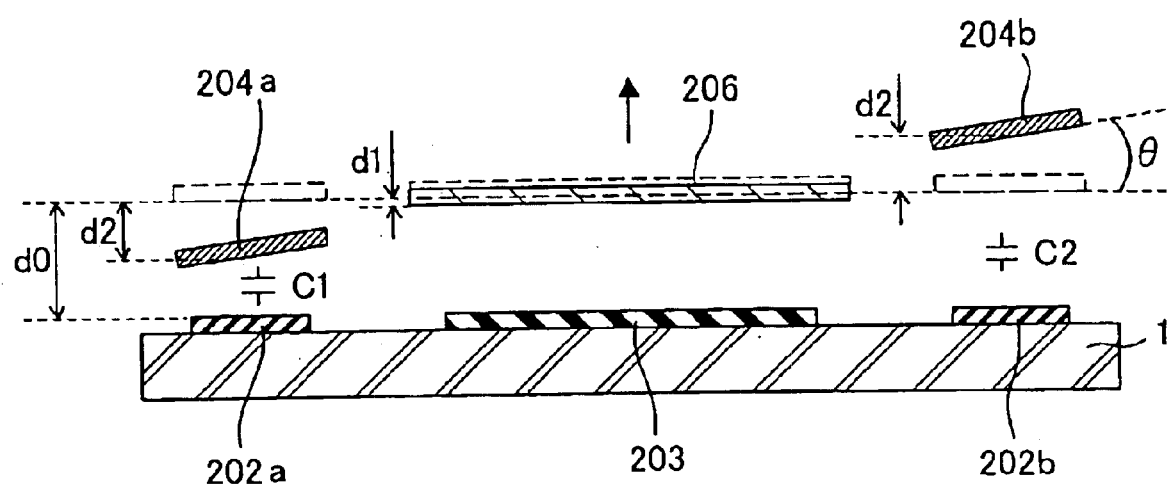
FIG. 23 is a sectional view for explaining a principle of acceleration detection in Embodiment 5 of the invention.

FIG. 23 is a sectional view for explaining a principle of acceleration detection in this embodiment. In FIG. 23, an acceleration perpendicular to the substrate 201 of the acceleration sensor is applied in the upward direction in the figure. Since an inertia force acts on the mass 206 in a direction opposite to the acceleration, the mass 206 is displaced in a direction in which it is brought close to the substrate 201 on the illustrated lower side. In other words, the mass 206 is displaced to a position, which is indicated by a solid line on the lower side, by a displacement amount d1 from an initial position indicated by a broken line. At this point, the movable electrode 204 inclines according to torsional deformation of the movable members 205. The first movable electrode portion 204a and the second movable electrode portion 204b are displaced downward and upward, respectively. In other words, the respective movable electrode portions are displaced to the position indicated by the solid line deviated from the initial position indicated by the broken line by a displacement amount d2. At this point, the displacement amount d2 of the first and second movable electrode portion is larger than the displacement amount d1 of the mass 206.

In addition, since an inter electrode distance of the first capacitance C1 is reduced from an initial distance d0 by the displacement amount d2, a capacity value thereof increases. On the other hand, an interelectrode distance of the second capacitance C2 is increased from the initial distance d0 by the displacement amount d2, a capacity value thereof decreases. By differentially detecting the changes in the capacitances C1 and C2, the applied acceleration can be measured.

Note that, in the case in which an application direction of an acceleration is downward in the figure, a displacement direction of the mass 206 and a torsion direction of the movable electrode 204 are simply inversed. The capacity value of the first capacitance C1 decreases and the capacity value of the second capacitance C2 increases. Thus, it is needless to mention that an acceleration can be measured in the same manner.

Figure 24:
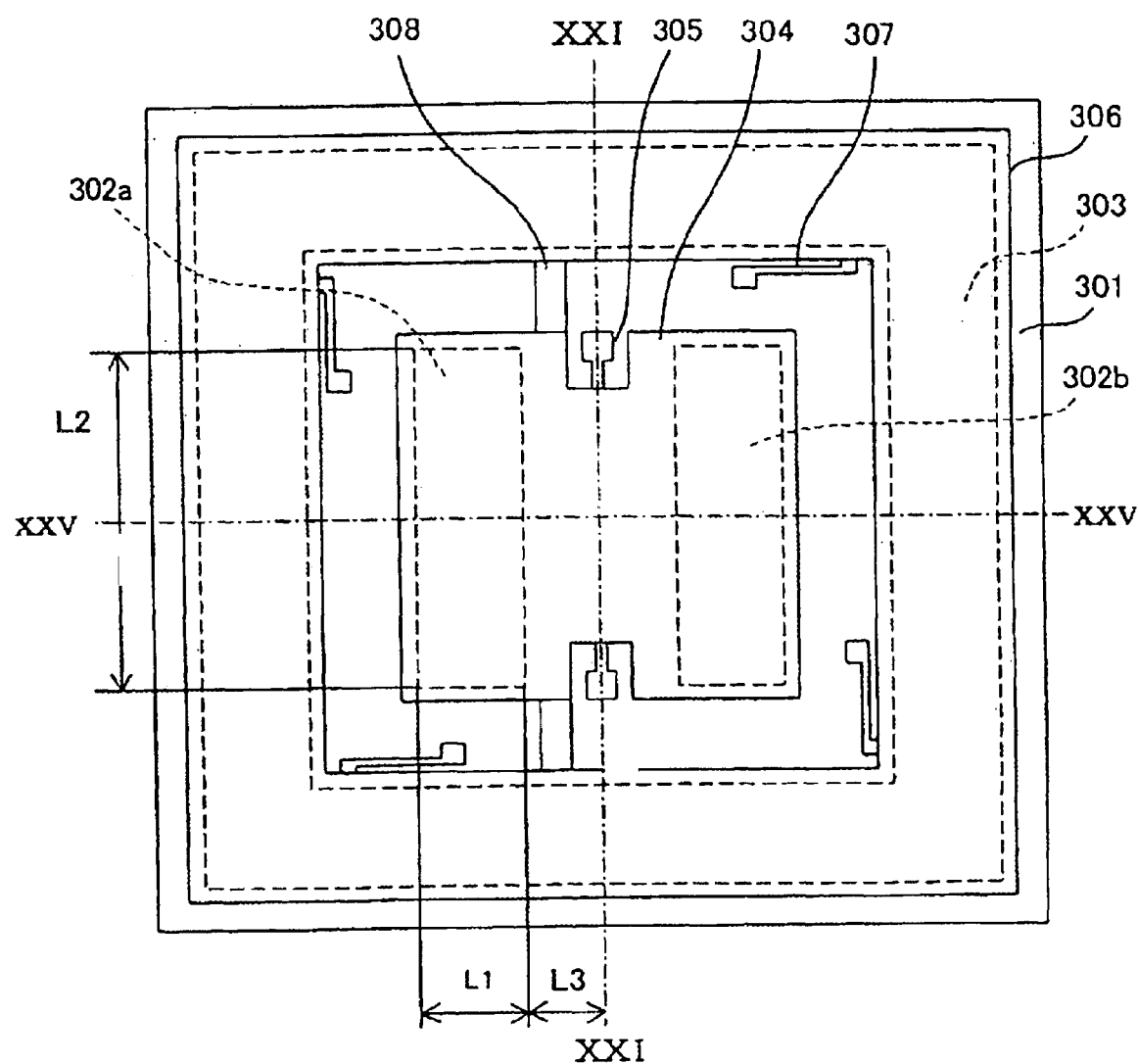
FIG. 24 is a plan view of an acceleration sensor of a comparative example.

Next, a positional relation between the movable electrode 204 and the mass 206 will be described. In FIG. 19, the movable electrode 204 is arranged so as to surround the mass 206. On the other hand, FIG. 24 is a plan view for explaining an acceleration sensor as a comparative example, in which a mass 306 is arranged so as to surround a movable electrode 304. In FIG. 24, a first fixed electrode 302a and a second fixed electrode 302b are arranged on a substrate 301.

The first fixed electrode 302a and the second fixed electrode 302b, together with the movable electrode 304, form the first capacitance C1 and the second capacitance C2. It is assumed that a width of the respective capacitance spaces is L1, a length thereof is L2, and a distance from a line XXI—XXI to the respective capacitance spaces is L3. Reference numeral 303 indicates a self-diagnosis electrode; 305, movable members; 307, mass supporting members; and 308, mass linking members.

Figure 25:
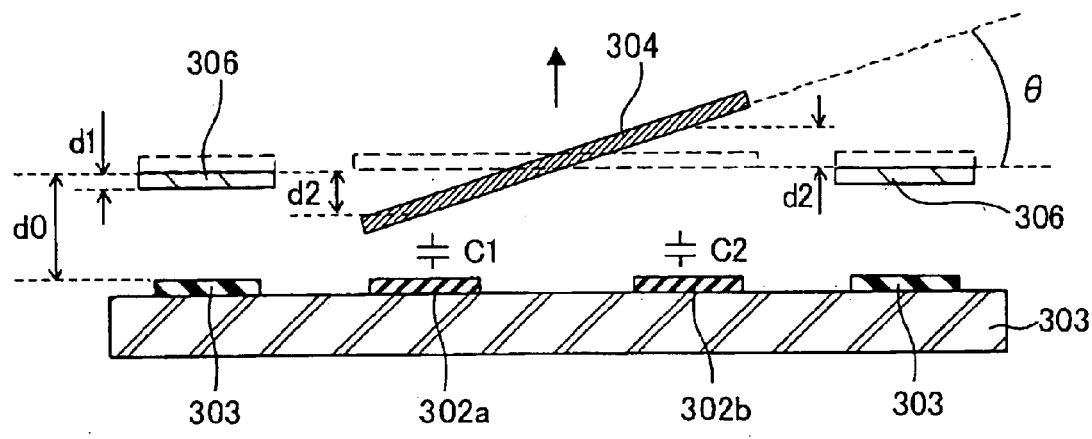
FIG. 25 is a sectional view for explaining a principle of acceleration detection in the acceleration sensor of the comparative example and is a sectional view taken at a line XXV—XXV in FIG. 24.

FIG. 25 is a sectional view for explaining a principle of acceleration detection in the comparative example and is a sectional view taken at a line XXV—XXV in FIG. 24. In FIG. 25, an acceleration is applied in the illustrated upward direction in the same manner as in FIG. 23. The mass 306 is displaced in the downward direction in the figure. In other words, the mass 306 is displaced to a position, which is indicated by a solid line on the lower side, by a displacement amount dl from an initial position indicated by a broken line. At this point, the movable electrode 304 inclines according to torsional deformation of the movable member 305 and is displaced to a position indicated by the solid line deviated from the initial position indicated by the broken line by the displacement amount d2. Capacitance value of the first capacitance C1 increases, whereas a capacitance of the second capacitance C2 decreases. By differentially detecting the changes in the capacitances C1 and C2, the applied acceleration can be measured.

Subsequently, characteristics of this embodiment and the comparative example were compared. For example, it is assumed that the width L1 and the length L2 of the capacitance spaces are 200 μm and 500 μm, and the initial interelectrode distance d0 is 2 μm in both of this embodiment and the comparative example. It is also assumed that the distance L3 from the line XXIV—XXIV to the capacitance spaces is 400 μm in this embodiment and 100 μm in the comparative example. It is assumed that the acceleration sensors have the capacitances C1 and C2 in the initial state of approximately 0.40 pF. The capacitances C1 and C2 in the case in which the acceleration is applied to these acceleration sensors as shown in FIGS. 23 and 25 and the movable electrodes are twisted by an angle θ are represented by the following expressions (1) and (2).

$$C_1 = -\frac{\varepsilon_0 L_2}{\tan\theta} \log\left(1 - \frac{L_1 \tan\theta}{d - L_3 \tan\theta}\right) \quad (1)$$

$$C_2 = \frac{\varepsilon_0 L_2}{\tan\theta} \log\left(1 + \frac{L_1 \tan\theta}{d + L_3 \tan\theta}\right) \quad (2)$$

where, $\varepsilon_0$ is vacuum dielectric constant, and d is interelectrode distance (d0±d2).

If an electrode area is the same for the first capacitance C1 and the second capacitance C2, a change d2 in an interelectrode distance necessary for obtaining the same capacity change is also the same. Therefore, in order to obtain the same change d2 in an interelectrode distance, the angle of torsion θ of the movable electrode can be controlled to be smaller in the case in which the movable electrode 204 is arranged so as to surround the mass 206 as shown in FIG. 19 than in the case in which the mass 306 is arranged so as to surround the movable electrode 304 as shown in FIG. 24. In other words, in this embodiment, there is an effect that, even if detection sensitivity is the same with respect to the comparative example, rigidity of the movable members can be increased, and reliability of the acceleration sensor can be improved.

Figure 26:
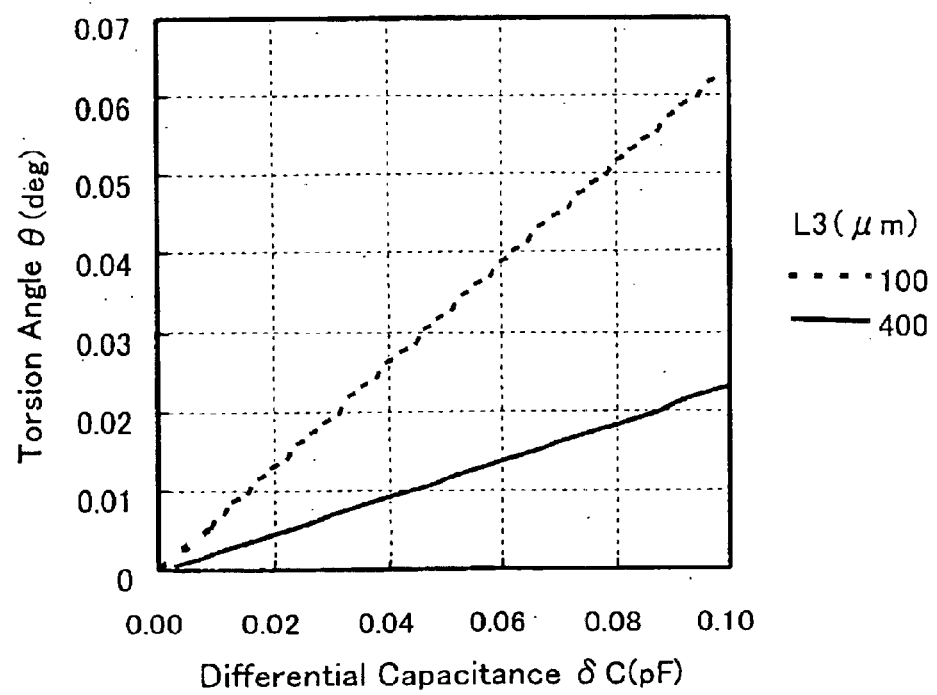
FIG. 26 is a characteristic chart concerning a differential capacitance and an angle of torsion in the acceleration sensor according to Embodiment 5 of the invention and the acceleration sensor of the comparative example.

FIG. 26 is a characteristic chart showing a relation between a differential capacitance and the angle of torsion θ of a movable electrode in this embodiment and the comparative example. Note that a differential capacitance δC is equal to C1–C2. For example, the angle of torsion θ necessary for obtaining a differential capacitance δC of 0.10 pF is approximately 0.023° in this embodiment's sample. It is seen that this is approximately ⅓ compared with approximately 0.063° of the comparative example.

In addition, a differential capacitance is standardized by a sum of the first and second capacitances C1 and C2 in the initial state. This is defined as a capacity change ΔC=δC/(C1+C2). When it is assumed that an angle of torsion and a capacity Change at the time when the differential capacitance δC is 0.10 pF are $\theta_0$ and $\Delta C_0$, respectively, non-linearity of an output signal is represented by the following expression (3).

$$\frac{\Delta C_0 \cdot \frac{\theta}{\theta_0} - \Delta C}{\Delta C_0} \quad (3)$$

Figure 27:
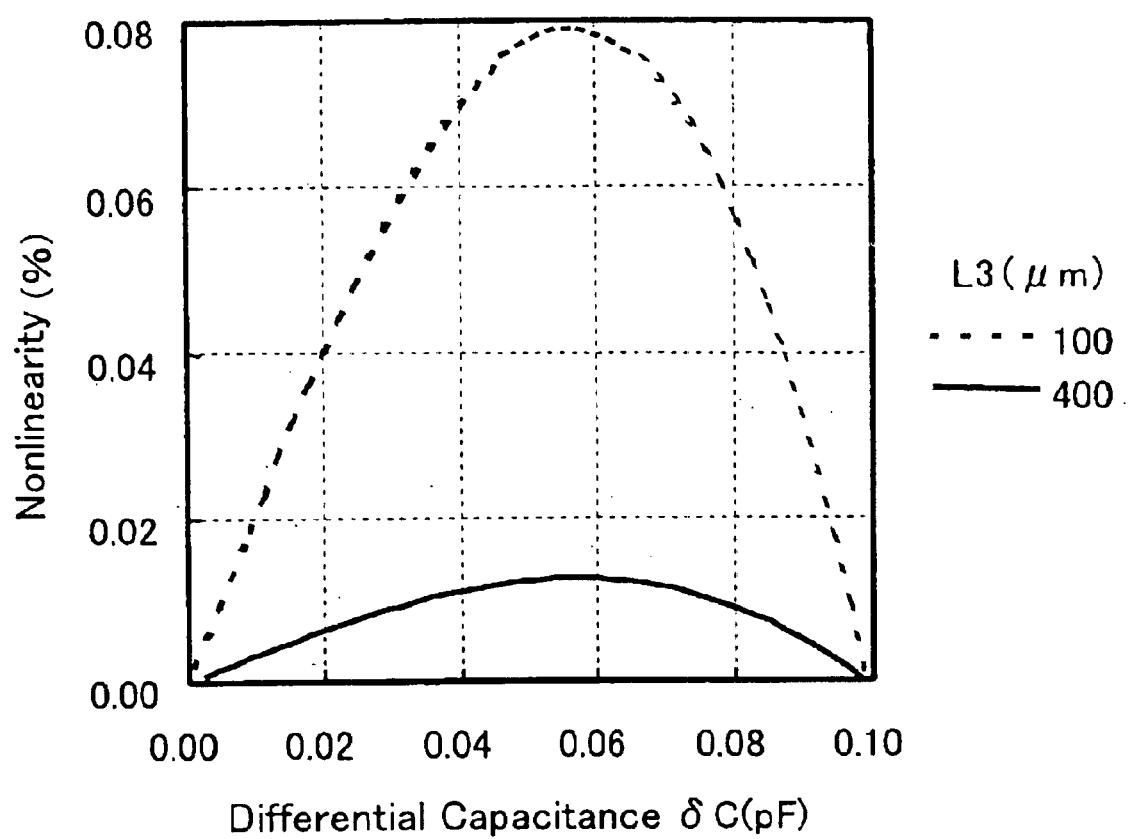
FIG. 27 is a characteristic chart concerning a differential capacitance and linearity of an output signal in the acceleration sensor according to Embodiment 5 of the invention and the acceleration sensor of the comparative example.

FIG. 27 is a characteristic chart showing a relation between a differential capacitance and non-linearity of an output signal. From this figure, maximum non-linearity is approximately 0.013% in the case of this embodiment's sample and approximately 0.080% in the case of the comparative example. Thus, the maximum non-linearity of this embodiment's sample is approximately ⅙ of that of the comparative example. In other words, in this embodiment's sample, there is an effect that linearity of an output signal with respect to an applied acceleration can be improved.

Moreover, the acceleration sensor according to the present invention is provided with the self-diagnosis electrode 203. The self-diagnosis electrode 203 faces the mass 206. By applying a voltage between the self-diagnosis electrode 203 and the mass 206, an electrostatic gravity can be generated between them to displace the mass downward in the figure, for example, as shown in FIG. 23. Even in the case in which an acceleration is not applied, by forcibly displacing the mass 206 in this way, the movable electrode 204 linked with the mass 206 by the link bar 208 can be inclined to generate a change in the first and second capacitance C1 and C2 in the same manner as the case in which an acceleration is applied. By detecting a capacity change generated in this way, the acceleration sensor can self-diagnose a function thereof as to whether the sensor structure has not been destroyed, whether characteristics has not been changed, and so on.

Embodiment 6

Figure 28:
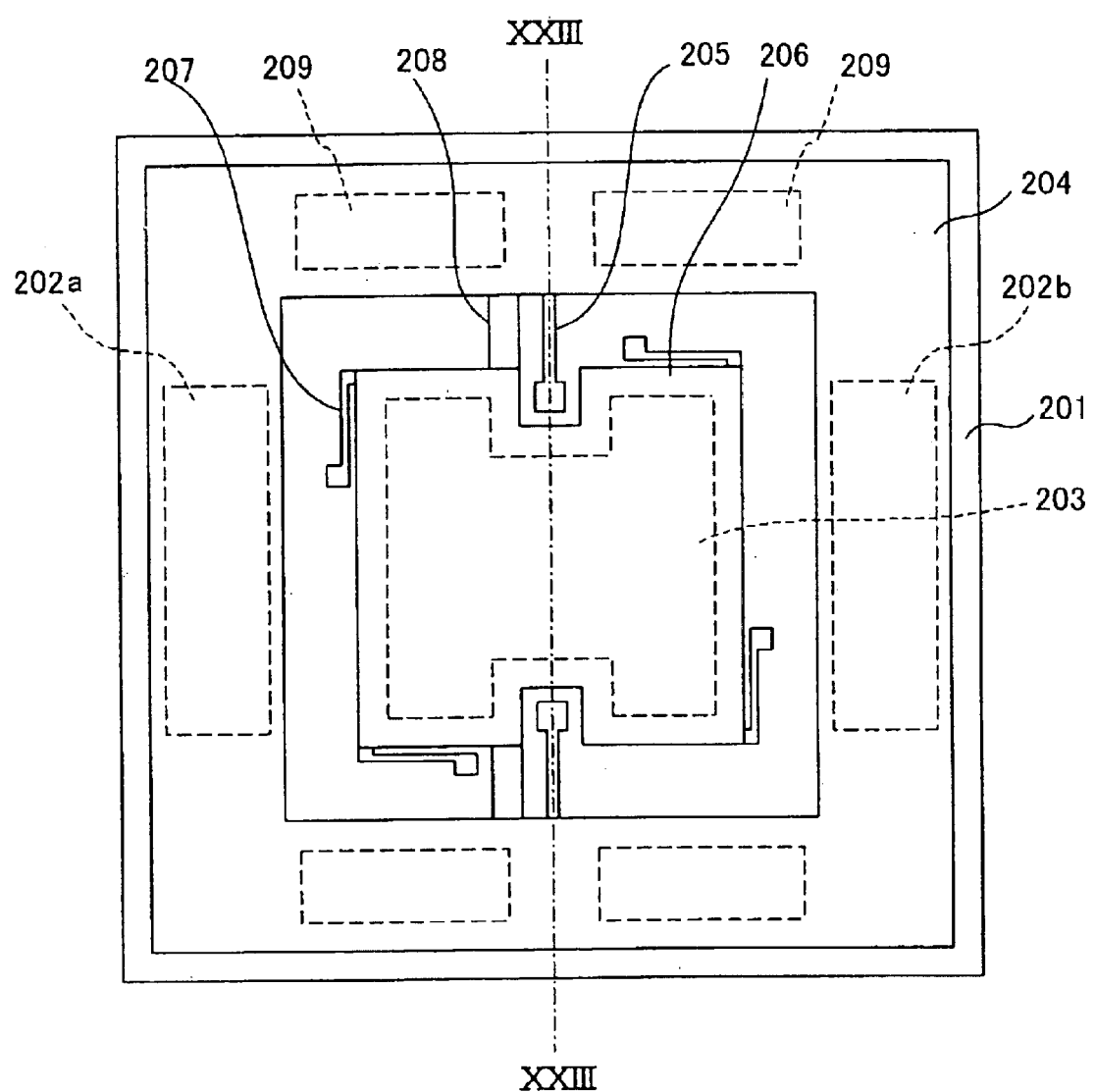
FIG. 28 is a plan view of an acceleration sensor according to Embodiment 6 of the present invention.

FIG. 28 is a plan view of an acceleration sensor for explaining Embodiment 6. In this embodiment, plural correcting electrodes 209 facing the movable electrode 204 is provided in Embodiment 1. The correcting electrodes 209 are formed on the substrate 201 so as to face the movable electrode portion linking portions 204c of the movable electrode 204. The correcting electrodes 209 are arranged on both the left and right sides of a line XXIII—XXIII on which the torsion axis of the movable members 205 passes.

In general, in an acceleration sensor of a differential capacitance type, in the case in which acceleration measurement in the vertical axis direction is required or the acceleration sensor is set in an inclined state, the mass 206 is displaced even in an initial state in which a measurement object is not moving. Therefore, the first and second capacitances C1 and C2 are unbalanced, and a certain offset is generated in an output signal.

For example, when the acceleration sensor is set with the illustrated lower side in FIG. 23 provided at its lowermost part, even if an measurement object does not move, the mass 206 is displaced downward by gravitational acceleration, and the movable electrode 204 is twisted in the counter-clockwise direction to deviate offset of an output signal. In the case in which such offset change is a problem, if the correcting electrode 209 closer to the second capacitance C2 side than the line XXVIII—XXVIII is selected out of the plural correcting electrodes 209. A voltage is applied between the correcting electrode 209 and the movable electrode portion linking portions 204c of the movable electrode 204. Then, a rotation moment in the clockwise direction acts on the movable electrode 204. Consequently, the inclination of the movable electrode 204 can be restored to return the first and second capacitances C1 and C2 to the balanced state. Therefore, the offset of the output signal can be corrected. Even if a setting state of the acceleration sensor is reversed vertically from the above-mentioned state, the offset of the output signal can be corrected if the correcting electrode 209 on the first capacitance C1 side is selected to apply a voltage in the same manner.

Embodiment 7

Figure 29:
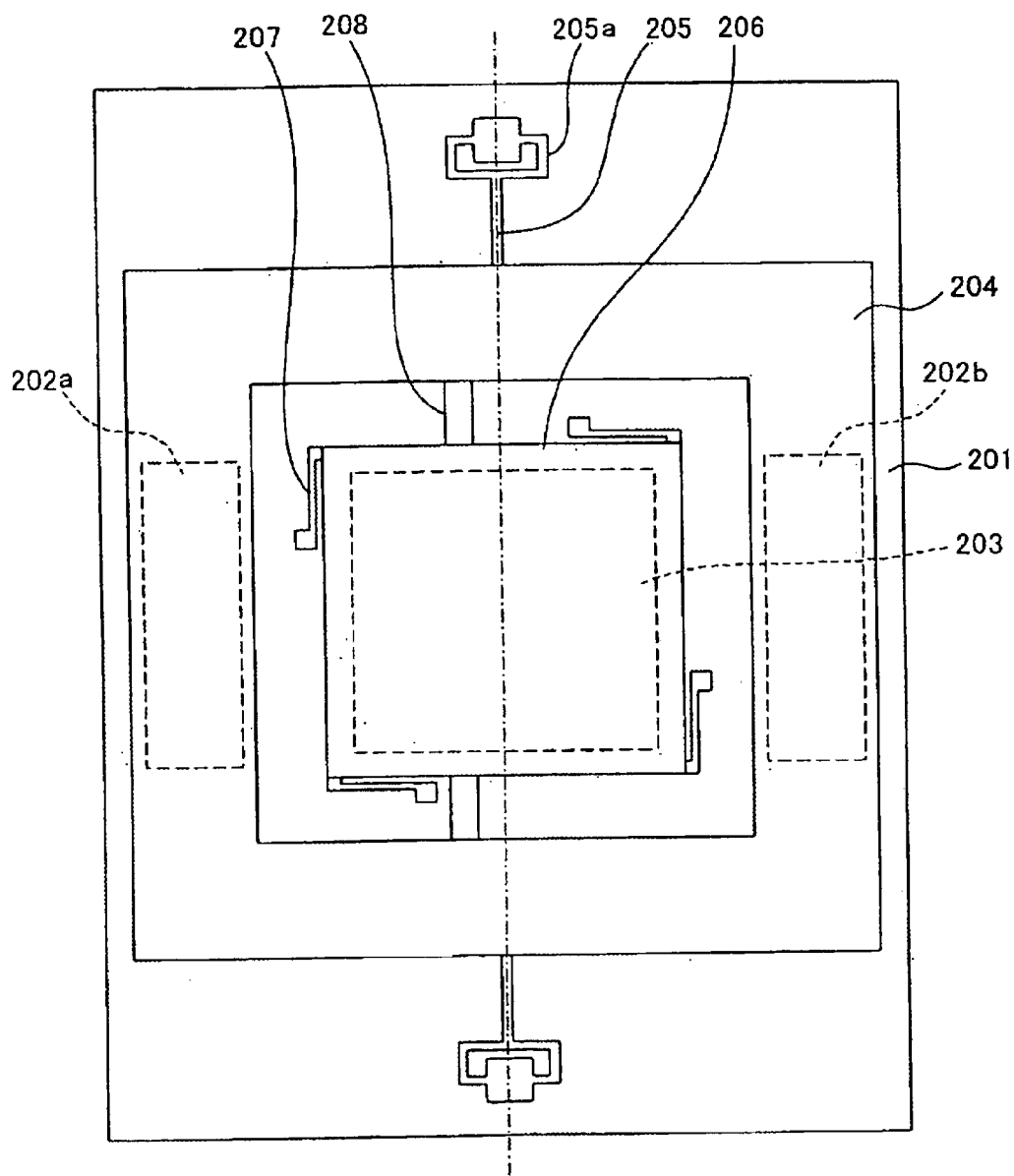
FIG. 29 is a plan view of an acceleration sensor according to Embodiment 7 of the present invention.

FIG. 29 is a plan view of an acceleration sensor for explaining Embodiment 7. This embodiment has the movable member 205 arranged outside the movable electrode 204 in Embodiment 5. In FIG. 29, the mass 206 is rectangular, so the mass thereof increases compared with the case in which the mass 206 has a depression as shown in FIG. 19. Moreover, the movable member 205 can be designed and arranged regardless of a shape of the mass 206. For example, stress buffer portions 205a may be provided in the movable members 205. In this case, the movable electrode 204 is supported at both ends thereof via the movable members 205. Thus, even if a residual stress exists in a material forming the movable electrode 204, the stress buffer portion 205a reduces the residual stress. Therefore, the residual stress is prevented from affecting the torsion bar parts of the movable members 205, and buckling of the movable electrode 204 can be prevented.

Embodiment 8

Figure 30:
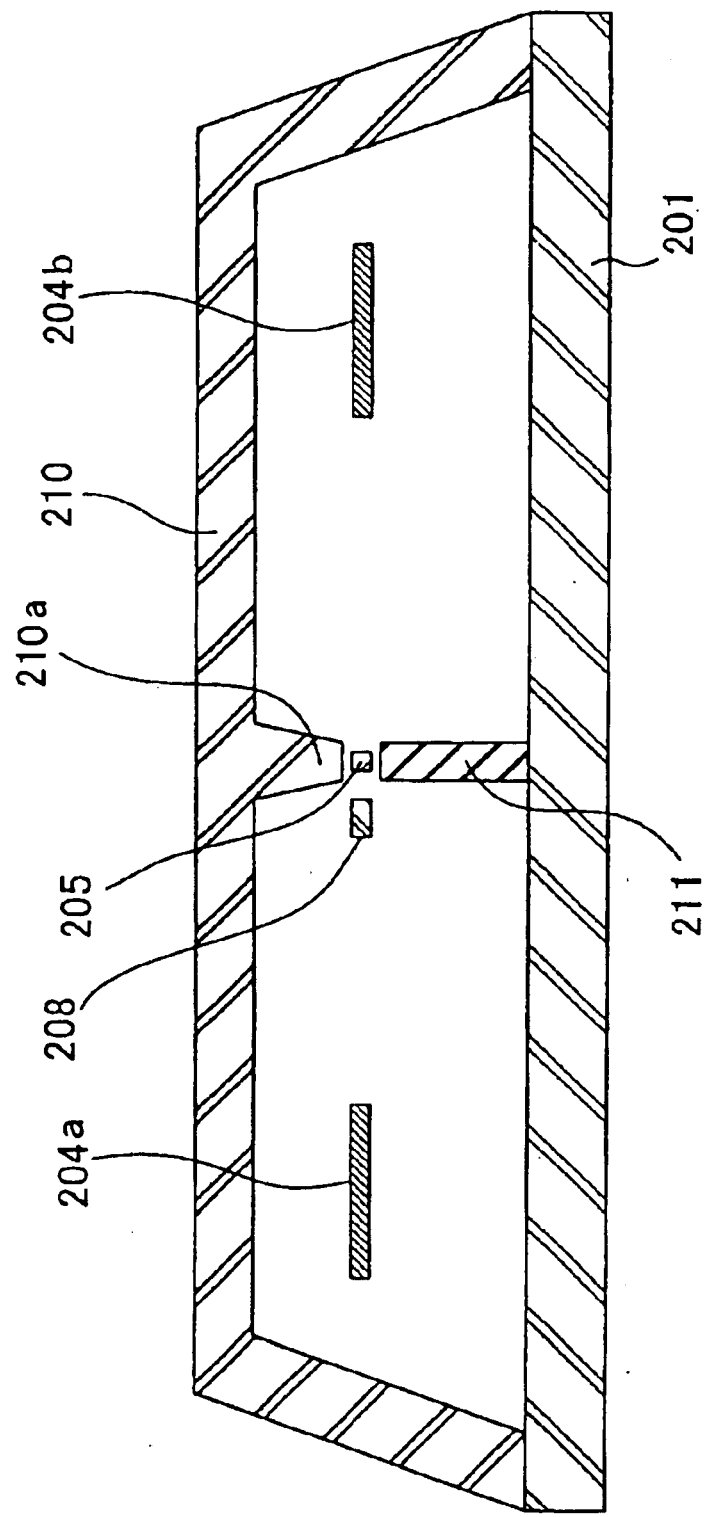
FIG. 30 is a sectional view of an acceleration sensor according to Embodiment 8 of the present invention.

FIG. 30 is a sectional view of an acceleration sensor for explaining Embodiment 8 and shows a section passing through the torsion bar part of the movable member 5 and the link bar 208. In this embodiment, projections are provided so as to nip the movable members 205 between them in Embodiment 5. The acceleration sensor in this embodiment includes a cap serving as a sealing member 210 for sealing the first fixed electrode 202a, the second fixed electrode 202b, the movable electrode 204, the movable members 205, the mass 206, the mass supporting members 207, and the link bar 208 between the sealing member and the substrate 201. The cap 210 protects the mass 206, the movable electrode 204, and the like. A projection 211 is formed on the substrate 201, and a projection 210a is formed on the cap 210. The projection 210a and the projection 211 are arranged so as to nip the movable member between them.

It is preferable to use monocrystal silicon for such a cap 210 and a projection 210a. The monocrystal silicon has etching anisotropy with respect to an alkaline etching liquid such as KOH. The cap 210 and the projection 210a can be formed collectively utilizing this etching anisotropy. In addition, for example, a polysilicon thin film formed by LPCVD or the like can be used for the projection 211 formed on the substrate 201.

As described above, the torsion bar parts of the movable members 205 are nipped by the projections 210a and 211 formed above and under them in the figure. Therefore, displacement of the torsion bar parts of the movable members 205 in the thickness direction of the substrate 201 is suppressed. In other words, a vibration mode, which is unnecessary for detection of an original acceleration such as an inertia force acting on the movable electrode 204 itself, can be suppressed. In addition, displacement of the movable electrode 204 at the time when an excessive acceleration is applied thereto can be suppressed. Therefore, reliability of the acceleration sensor can be improved.

INDUSTRIAL APPLICABILITY

As described above, the acceleration sensor according to the invention is suitable for being used as a high impact resistant and highly reliable acceleration sensor.

What is claimed is:

1. An acceleration sensor, comprising:
   a substrate;
   first and second fixed electrodes on the substrate;
   a movable electrode opposite, spaced from, and facing the first and second fixed electrodes;
   a first elastic supporting body elastically supporting the movable electrode on the substrate for deflection relative to the substrate;
   a mass;
   a second elastic supporting body supporting the mass on the substrate, the mass being movable in response to an acceleration in a direction perpendicular to the substrate; and
   a linking portion linking the movable electrode and the mass at a position spaced from a deflection axis of the movable electrode by a distance, wherein acceleration is measured based on changes in a first capacitance between the first fixed electrode and the movable electrode and a second capacitance between the second fixed electrode and the movable electrode.

2. The acceleration sensor according to claim 1, wherein the movable electrode is surrounded by the mass and centers of gravity of the movable electrode and of the mass coincide.

3. The acceleration sensor according to claim 1, further comprising a self-diagnosis electrode facing the mass on the substrate for checking operation of the acceleration sensor upon application of a voltage between the self-diagnosis electrode and the mass.

4. The acceleration sensor according to claim 1, further comprising a driving electrode facing the movable electrode on the substrate for driving the movable electrode to a predetermined position upon application of a voltage between the driving electrode and the movable electrode.

5. The acceleration sensor according to claim 1, further comprising a correcting electrode facing the mass on the substrate for correcting capacitance between the first and second fixed electrodes and the movable electrode, based on capacitance between the correcting electrode and the mass.

6. The acceleration sensor according to claim 5, further comprising:
   a first capacitance voltage converter for converting capacitance between the first and second fixed electrodes and the movable electrode to a first voltage;
   a second capacitance voltage converter for converting capacitance between the mass and the correcting electrode to a second voltage; and
   a processor for computing a first output value from the first capacitance voltage converter and a second output value from the second capacitance voltage converter.

7. The acceleration sensor according to claim 1, further comprising second and third acceleration sensors for respectively measuring acceleration in a direction inside the substrate, wherein the second acceleration sensor and the third acceleration sensor respond to accelerations in directions orthogonal to each other.

8. The acceleration sensor according to claim 1, wherein at least the movable electrode, the mass, the first elastic supporting body, the second elastic supporting body, and the linking portion are integral and are polysilicon.

9. The acceleration sensor according to claim 1, wherein at least the movable electrode, the mass, the first elastic supporting body, the second elastic supporting body, and the linking portion are integral and are monocrystalline silicon.

10. The acceleration sensor according to claim 1, wherein the mass is surrounded by the movable electrode and centers of gravity of the movable electrode and the mass coincide.

11. The acceleration sensor according to claim 10, further comprising a correcting electrode facing the mass on the substrate for correcting capacitance between the first and second fixed electrodes and the movable electrode, based on capacitance between the correcting electrode and the mass.

12. The acceleration sensor according to claim 10, further comprising a sealing member sealing the first and second fixed electrodes, the movable electrode, the first elastic supporting body, the mass, the second elastic supporting member, and the linking portion between the sealing member and the substrate, wherein the substrate and the sealing member have projections nipping the first elastic supporting body between them.

13. An acceleration sensor comprising:
   first and second fixed electrodes on a substrate;
   a movable electrode including
      a first movable electrode portion which, together with the first fixed electrode, forms a first capacitance,
      a second movable electrode portion which, together with the second fixed electrode, forms a second capacitance, and
      movable electrode portion linking portions which link the first and second movable electrode portions, spaced apart from and facing the first and second fixed electrodes;
   movable members connecting the movable electrode portion linking portions and the substrate, spaced apart from each other, supporting the movable electrode, and torsionally deformable;
   a mass arranged between the first and second movable electrode portions and displaced in a thickness direction of the substrate in response to an acceleration;
   mass supporting members elastically supporting the mass and spaced apart from the substrate; and
   mass linking members linking the movable electrode portion linking portions and the mass, wherein the movable members are arranged on a straight line passing through a middle point between the first and second movable electrode portions, and the mass linking members are arranged in parallel with and spaced apart from the movable members.

14. The acceleration sensor according to claim 13, including a correcting electrode facing the movable electrode portion linking portions located on the substrate, so that a voltage applied between the movable electrode portion linking portions and the correcting electrode corrects balance of the first and second capacitances.

15. The acceleration sensor according to claim 14, further comprising a sealing member sealing the first and second fixed electrodes, the movable electrode, the movable members, the mass, the mass supporting members, and the mass linking members between the sealing member and the substrate, wherein the substrate and the sealing member have projections nipping the movable members between them.

* * * * *